(12) United States Patent
Arai

(10) Patent No.: US 6,243,748 B1
(45) Date of Patent: Jun. 5, 2001

(54) METHOD AND APPARATUS FOR MANAGING A LARGE SCALE NETWORK INCLUDING APPARATUSES TO BE MANAGED

(75) Inventor: Toshihiko Arai, kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/126,246

(22) Filed: Jul. 30, 1998

(30) Foreign Application Priority Data

Oct. 20, 1997 (JP) .................................................... 9-286665

(51) Int. Cl.⁷ ....................................................... G06F 13/00
(52) U.S. Cl. ........................... 709/223; 709/224; 709/313
(58) Field of Search ..................................... 709/220, 221, 709/222, 223, 224, 227, 230, 237, 313

(56) References Cited

U.S. PATENT DOCUMENTS

| | | | |
|---|---|---|---|
| 5,568,605 | * 10/1996 | Clouston et al. .......................... | 714/4 |
| 5,703,938 | * 12/1997 | Lucas et al. .......................... | 379/112 |
| 5,710,885 | * 1/1998 | Bondi ................................... | 709/224 |
| 5,734,642 | * 3/1998 | Vaishnavi et al. .................... | 370/255 |
| 5,842,043 | * 11/1998 | Nishimura .............................. | 710/36 |
| 6,052,722 | * 4/2000 | Taghadoss ............................. | 709/223 |
| 6,112,015 | * 8/2000 | Planas et al. .................... | 395/200.53 |

* cited by examiner

Primary Examiner—Viet D. Vu
(74) Attorney, Agent, or Firm—Helfgott & Karas, P C.

(57) ABSTRACT

In a large-scale network having a plurality of apparatuses to-be-managed, and a managing apparatus which manages the apparatuses to-be-managed; the apparatus to-be-managed comprises a number-of-times-of-status-changes information update unit which updates the cumulative number of times of status changes, and a number-of-times-of-status-changes information storage unit which stores therein the cumulative number of times of status changes as updated by the number-of-times-of-status-changes information update unit; and the managing apparatus comprises a number-of-times-of-status-changes information acquisition unit which acquires the number-of-times-of-status-changes information from the number-of-times-of-status-changes information storage unit, a status change decision unit which decides whether any status change is present or absent, in accordance with the numbers of times of status changes as acquired from the number-of-times-of-status-changes information acquisition unit, and a status information acquisition unit which acquires status information from the apparatus to-be-managed in a case where the presence of the status change has been decided by the status change decision unit.

16 Claims, 34 Drawing Sheets

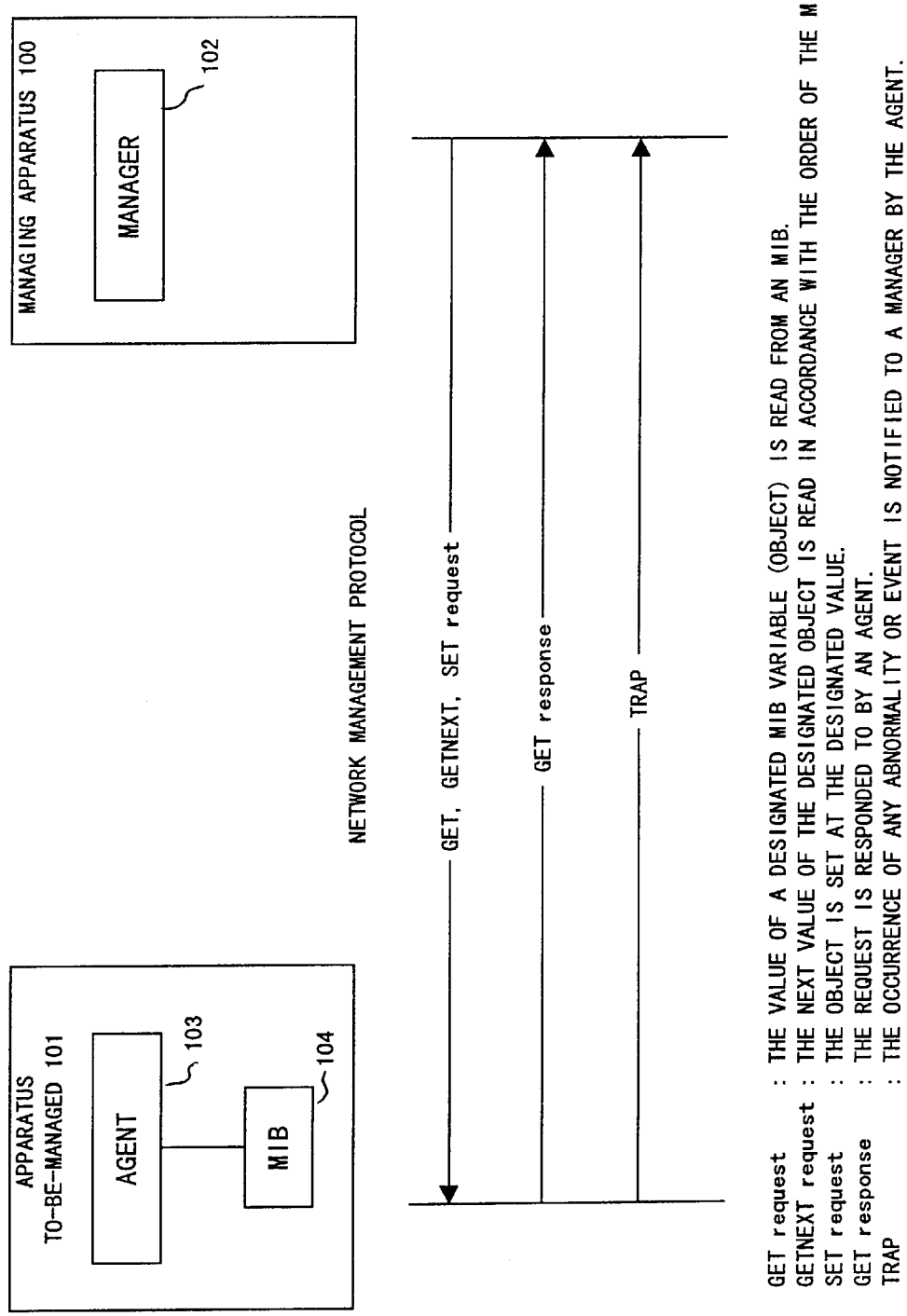

M: MANAGER APPARATUS

A(1)~A(n): AGENT APPARATUSES

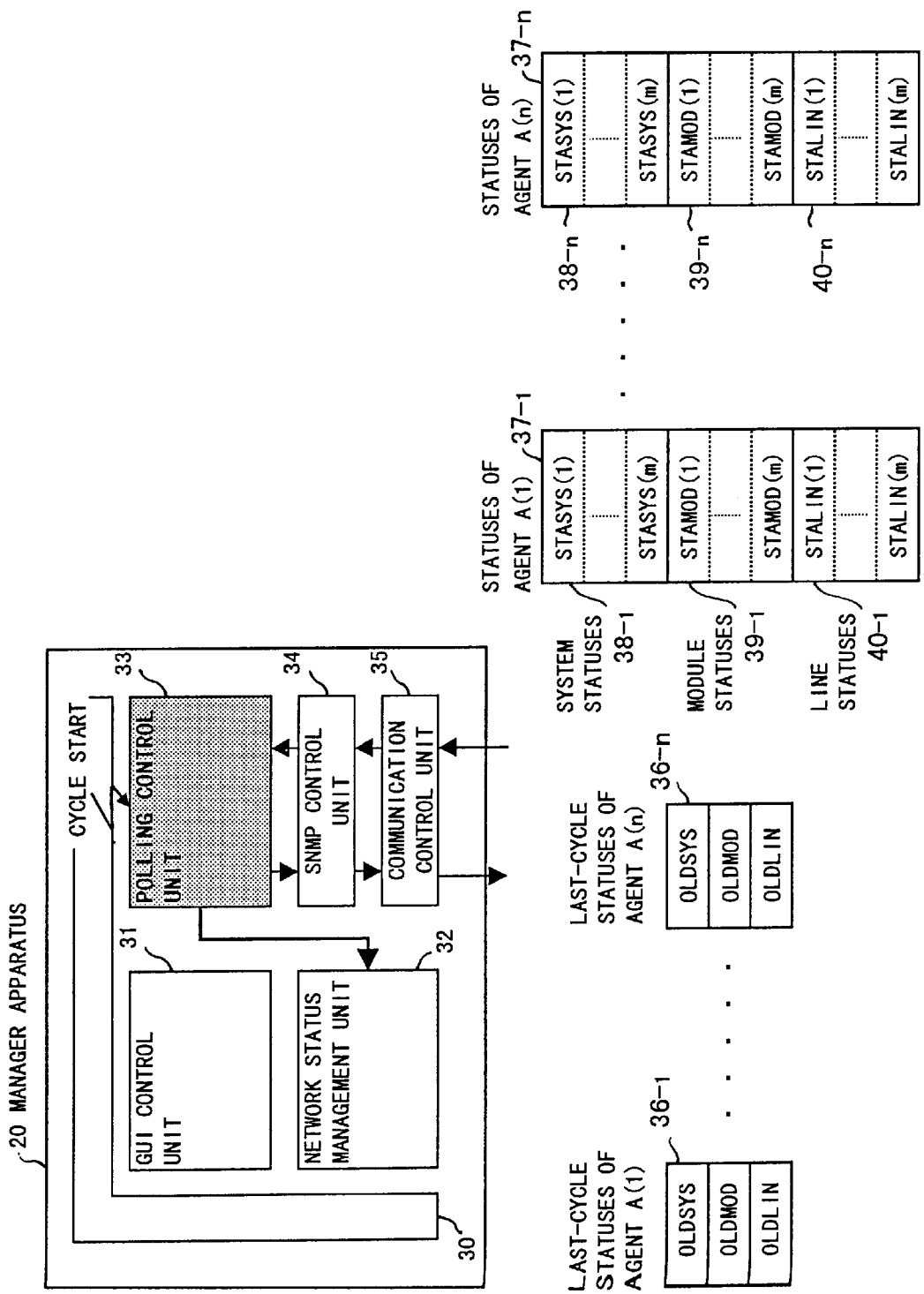
F I G. 7

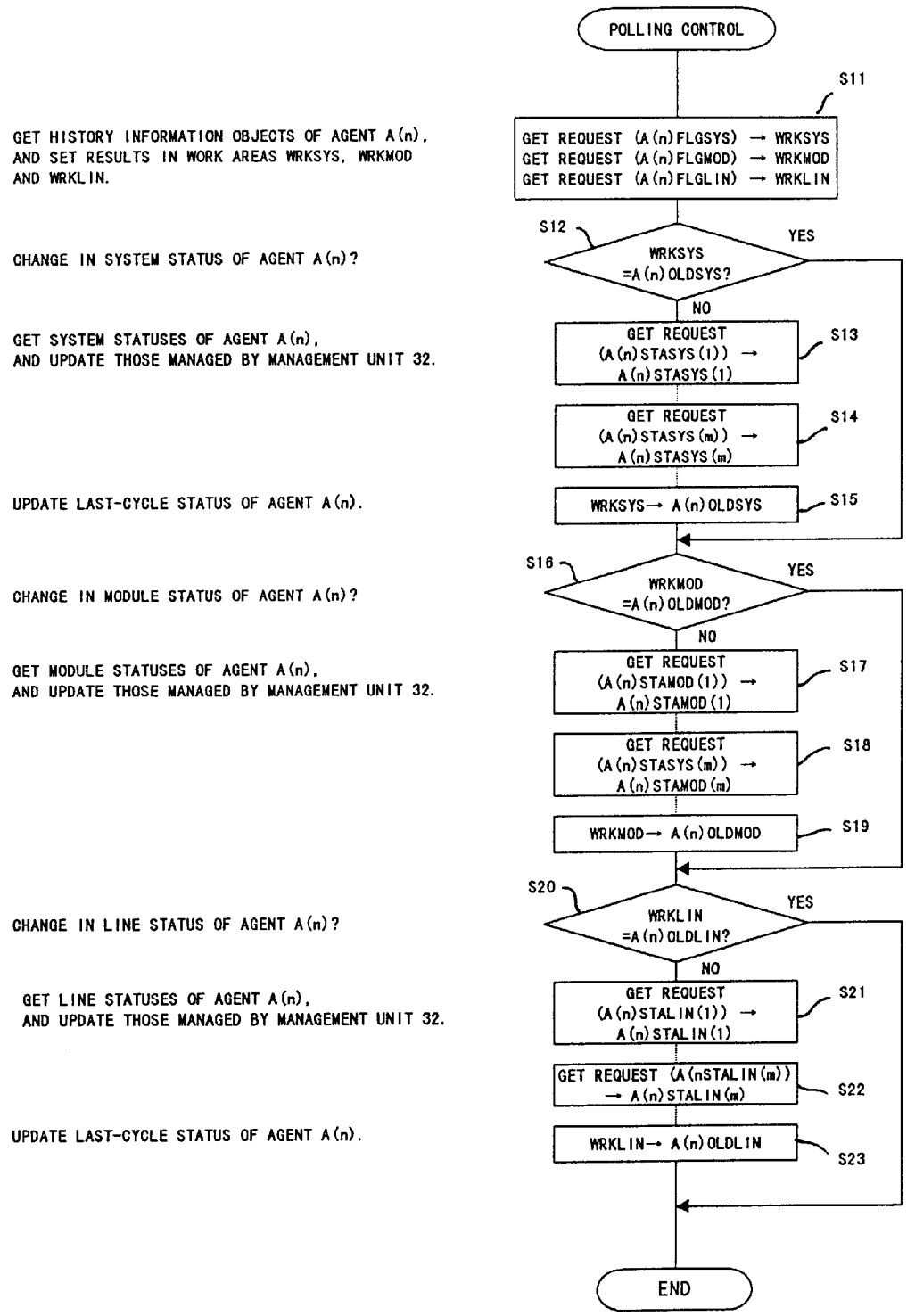
F I G. 8

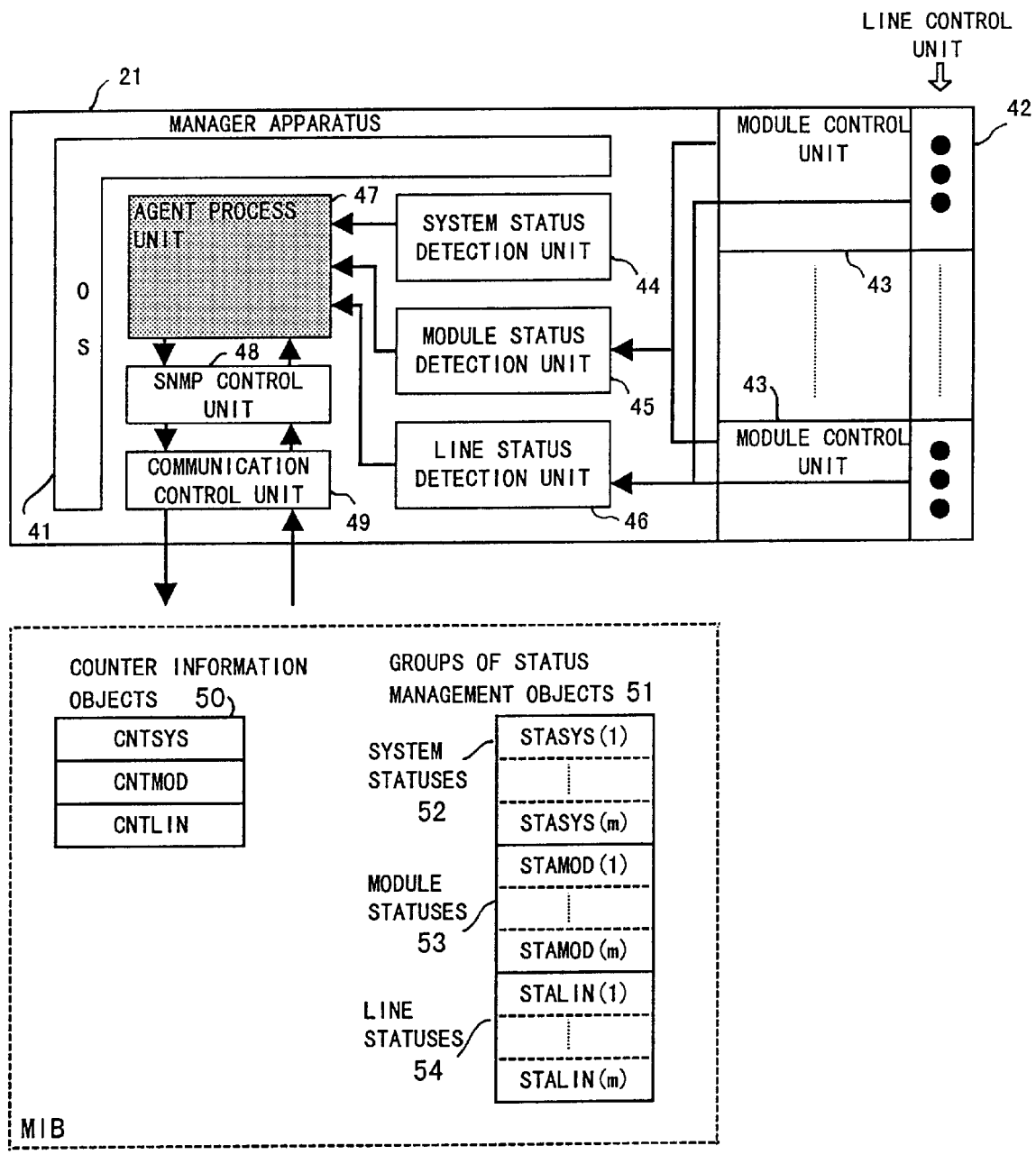
F I G. 9

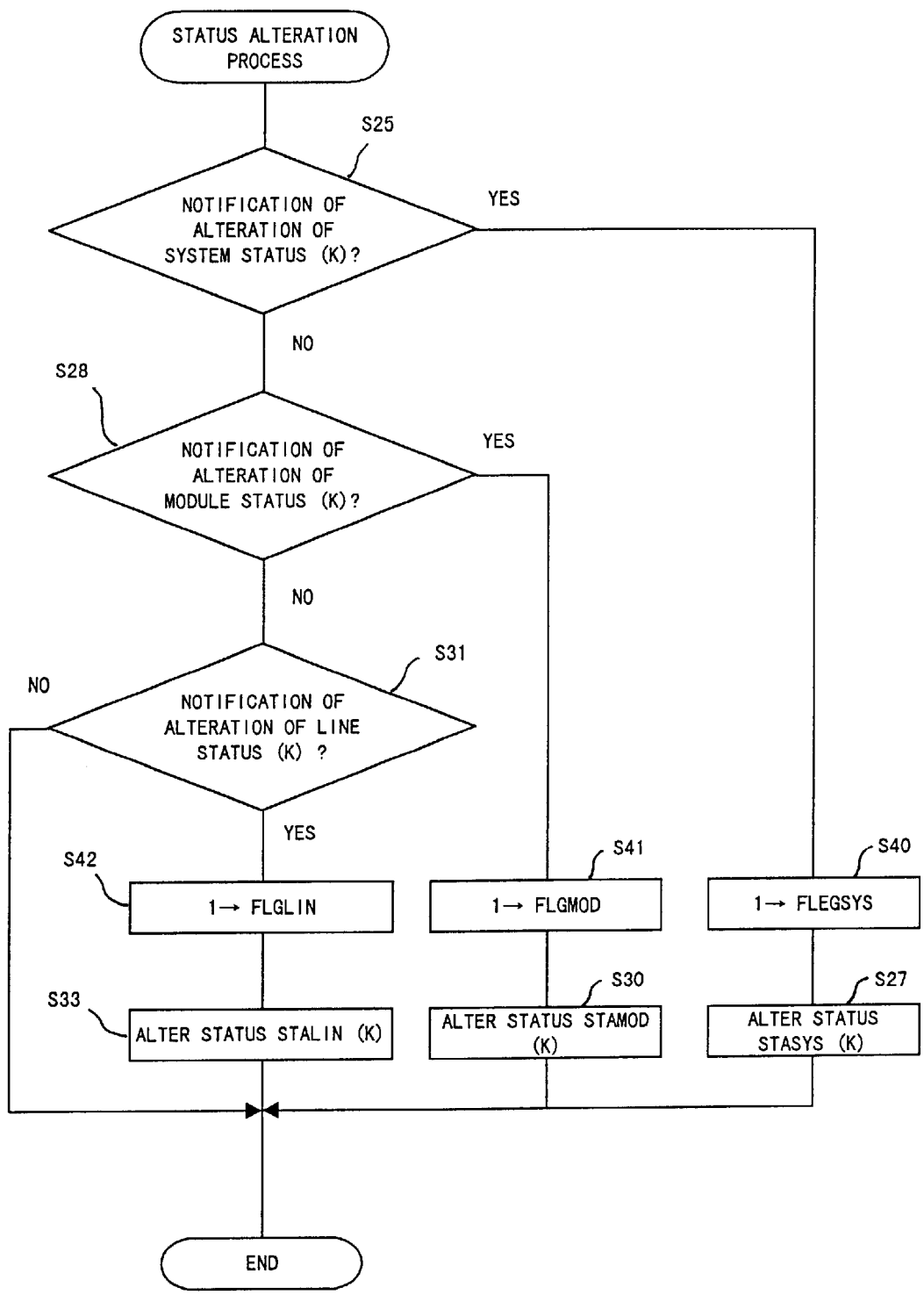
F I G. 1 5

```
internet           OBJECT IDENTIFIER ::=  ( iso(1) org(3) dod(6)  1 )
  private          OBJECT IDENTIFIER ::=  ( internet 4 )
    enterprises    OBJECT IDENTIFIER ::=  ( privatre 1 )
      fujitsu      OBJECT IDENTIFIER ::=  ( enterprises 211 )
        product    OBJECT IDENTIFIER ::=  ( fujitsu 1 )
          nonos    OBJECT IDENTIFIER ::=  ( product 127 )
APPARATUS TO-BE-HANDLED →  awn       OBJECT IDENTIFIER ::=  ( nonos 29 )
HISTORY INFORMATION →       cnt      OBJECT IDENTIFIER ::=  ( awn 1 )
STATUS MANAGEMENT →         stat     OBJECT IDENTIFIER ::=  ( awn 2 )
 SYSTEM STATUS →              statsys    OBJECT IDENTIFIER ::=  ( stat 1 )
 MODULE ATATUS →              statmod    OBJECT IDENTIFIER ::=  ( stat 2 )
 LINE STATUS →                statlin    OBJECT IDENTIFIER ::=  ( stat 2 )
```

FIG. 19

| MIB NAME | OBJECT NAME | SYNTAX | LENGTH | SIGNIFICANCE |
|---|---|---|---|---|
| cntsys | 1.3.6.1.4.1.211.1.127.29.1.0 | integer | 1 | COUNTER INFORMATION |
| cntmod | 1.3.6.1.4.1.211.1.127.29.1.1 | integer | 1 | COUNTER INFORMATION |
| cntlin | 1.3.6.1.4.1.211.1.127.29.1.2 | integer | 1 | COUNTER INFORMATION |

FIG. 20

(1) SYSTEM STATUSES

| MIB NAME | OBJECT NAME | SYNTAX | LENGTH | SIGNIFICANCES |
|---|---|---|---|---|
| statsys1 | 1.3.6.1.4.1.211.1.127.29.2.1.0 | OCTET STRING | 1 | 0 = NORMAL, 1 = ABNORMAL |
| ... | | | | |
| statsysm | 1.3.6.1.4.1.211.1.127.29.2.1.m-1 | OCTET STRING | 1 | 0 = NORMAL, 1 = ABNORMAL |

(2) MODULE STATUSES

| MIB NAME | OBJECT NAME | SYNTAX | LENGTH | SIGNIFICANCES |
|---|---|---|---|---|
| statmod1 | 1.3.6.1.4.1.211.1.127.29.2.2.0 | OCTET STRING | 1 | 0 = NORMAL, 1 = ABNORMAL, 2 = RESERVED |
| ... | | | | |
| statmodm | 1.3.6.1.4.1.211.1.127.29.1.2.m-1 | OCTET STRING | 1 | 0 = NORMAL, 1 = ABNORMAL, 2 = RESERVED |

(3) LINE STATUSES

| MIB NAME | OBJECT NAME | SYNTAX | LENGTH | SIGNIFICANCES |
|---|---|---|---|---|
| statlin1 | 1.3.6.1.4.1.211.1.127.29.2.3.0 | OCTET STRING | 1 | 0 = NORMAL, 1 = ABNORMAL, 2 = RESERVED |
| ... | | | | |
| statlinm | 1.3.6.1.4.1.211.1.127.29.1.3.m-1 | OCTET STRING | 1 | 0 = NORMAL, 1 = ABNORMAL, 2 = RESERVED |

FIG. 21

```
internet               OBJECT IDENTIFIER ::=  ( iso(1) org(3) dod(6)  1 )
    private            OBJECT IDENTIFIER ::=  ( internet 4 )
       enterprises     OBJECT IDENTIFIER ::=  ( privatre 1 )
          fujitsu      OBJECT IDENTIFIER ::=  ( enterprises 211 )
             product   OBJECT IDENTIFIER ::=  ( fujitsu 1 )
                nonos  OBJECT IDENTIFIER ::=  ( product 127 )
APPARATUS TO-BE-HANDLED→  awn    OBJECT IDENTIFIER ::=  ( nonos 29 )
     FLAG INFORMATION→    flg   OBJECT IDENTIFIER ::=  ( awn 1 )
   STATUS MANAGEMENT→    stat   OBJECT IDENTIFIER ::=  ( awn 2 )
          SYSTEM STATUS→  statsys   OBJECT IDENTIFIER ::=  ( stat 1 )
          MODULE STATUS→  statmod   OBJECT IDENTIFIER ::=  ( stat 2 )
            LINE STATUS→  statlin   OBJECT IDENTIFIER ::=  ( stat 3 )
```

FIG. 23

| MIB NAME | OBJECT NAME | SYNTAX | LENGTH | SIGNIFICANCES |
|---|---|---|---|---|
| flgsys | 1.3.6.1.4.1.211.1.127.29.1.0 | BIT STRING | 1 | 0 = ABSENCE OF STATUS CHANGE, 1 = PRESENCE OF STATUS CHANGE |
| flgmod | 1.3.6.1.4.1.211.1.127.29.1.1 | BIT STRING | 1 | 0 = ABSENCE OF STATUS CHANGE, 1 = PRESENCE OF STATUS CHANGE |
| flglin | 1.3.6.1.4.1.211.1.127.29.1.2 | BIT STRING | 1 | 0 = ABSENCE OF STATUS CHANGE, 1 = PRESENCE OF STATUS CHANGE |

FIG. 24

LS UNIT #1 (INCLUDING TIME SWITCHES TSW)

| LS CARD | LS CARD | LS CARD | LS CARD | LS CARD | TSW #0 | LSC #0 | LSC #1 | TSW #1 | LS CARD | LS CARD | LS CARD | LS CARD | LS CARD | PWR2 #0 | PWR2 #1 |
|---|---|---|---|---|---|---|---|---|---|---|---|---|---|---|---|
|  |  |  |  |  |  |  |  |  |  |  |  |  |  |  |  |

CARD NOs. → 01  02  03  04  05  06  07  08  09  10  11  12  13  14

(NOTE 1) THE PACKAGING POSITIONS OF CONTROLLERS LSC SHALL BE FIXED TO NOs. 7 AND 8.
(NOTE 2) THE PACKAGING POSITIONS OF TIME SWITCHES TSW SHALL BE FIXED TO NOs. 6 AND 9.
(NOTE 3) THE PACKAGING POSITIONS OF POWER SUPPLIES PWR SHALL BE FIXED, AND SHALL NOT BE ENDOWED WITH CARD NOs.

LS UNITS #2~ #8 (NOT INCLUDING TIME SWITCHS TSW)

| LS CARD | LS CARD | LS CARD | LS CARD | LS CARD | LS CARD | LSC #0 | LSC #1 | LS CARD | LS CARD | LS CARD | LS CARD | LS CARD | LS CARD | PWR2 #0 | PWR2 #1 |
|---|---|---|---|---|---|---|---|---|---|---|---|---|---|---|---|
|  |  |  |  |  |  |  |  |  |  |  |  |  |  |  |  |

CARD NOs → 01  02  03  04  05  06  07  08  09  10  11  12  13  14

(NOTE 1) THE PACKAGING POSITIONS OF CONTROLLERS LSC SHALL BE FIXED TO NOs. 7 AND 8.
(NOTE 2) THE PACKAGING POSITIONS OF POWER SUPPLIES PWR SHALL BE FIXED, AND SHALL NOT BE ENDOWED WITH CARD NOs.

FIG. 30

METHOD AND APPARATUS FOR MANAGING A LARGE SCALE NETWORK INCLUDING APPARATUSES TO BE MANAGED

BACKGROUND OF THE INVENTION

1. Field of the Invention

The present invention relates to a management system for a network. More particularly, it relates to a network management system in a large-scalenetwork which is constituted by a large number of nodes, and in which the nodes are structurally complicated and require many sorts of status information on subjects to-be-managed.

2. Description of the Related Art

In a network such as local area network (LAN) or wide area network (WAN), the simple network management protocol (SNMP) being the network management protocol of the Internet conformed to the TCP/IP (Transmission Control Protocol/Internet Protocol), with which even different types of machines can be managed by common specifications, is adopted as a protocol for managing the network.

FIG. 1A is a diagram for explaining the outline of a network management system based on the SNMP. In a management model adopted in the SNMP, a protocol for managing the Internet works in the application layer of the TCP/IP, and a manager and a managee assume the form of a client and a server. Referring to FIG. 1A, a managing apparatus 100 functions as the client and operates as the manager 102. An apparatus to-be-managed 101 functions as the server and operates as an agent 103.

The apparatus to-be-managed 101 includes therein a database 104 called "management information base (MIB)" in which status information items on subjects for management, for example, various modules constituting a node, lines etc. are accumulated.

With the SNMP, by way of example, the manager 102 requests the agent 103 to get the value of status information (an object) on a subject for management, through a GET request. The agent 103 responds to the request as a GET response, and notifies the status information to the manager 102 as information necessary for the management. Besides, the agent 103 notifies an abnormal situation or the like having occurred on the side of the apparatus to-be-managed 101, to the manager 102 through a TRAP. Employed here is a system wherein the manager 102 sends the GET requests to the agent 103 at, for example, regular intervals, thereby to poll the information necessary for the management.

FIG. 1B is a diagram for explaining a network management system in a local area network which utilizes the SNMP. Referring to the figure, a network managing apparatus 100 is connected to the local area network 106 in which a plurality of workstations 105 are interconnected. Information items (objects) to be managed for each workstation 105 are the two items of a system status and an interface (port) status. The network managing apparatus 100 manages the network by periodically repeating supervision sequences for the respective workstations 105, each of the sequence for one workstation 105 consisting of a GET request for acquiring the system status, a response to the request for the system status by the workstation 105, a GET request for acquiring the interface status, and a response to the request for the interface status.

Heretofore, apparatuses to be managed by the SNMP have usually been workstations which constitute a local area network, and routers, bridges, hubs etc. which interconnect LANs. As information items (objects) on the subjects to-be-managed, it has sufficed to define a comparatively small number of objects, for example, two objects for one workstation as explained with reference to FIG. 1B.

Recently, however, the structure of a node (apparatus) which constitutes a WAN, especially an ATM (Asynchronous Transfer Mode)-WAN, has become complicated, and the objects of subjects for management (the status information items of various control modules including line control modules, trunk lines, terminal lines, etc. as constitute the apparatus) have become large in the number of sorts and large in quantities. Moreover, the number of nodes constituting the network has enlarged to increase the loads of a manager in an MIB information acquisition process for one agent and in MIB information acquisition processes for many agents. This has led to the problem that a status information polling period for all the agents lengthens, making it difficult to incarnate the real time management of the network. In other words, the management of such a large-scale network by the use of the SNMP necessitates the adoption of a dedicated apparatus of high price and high performance or the installation of a plurality of manager apparatuses.

SUMMARY OF THE INVENTION

An object of the present invention consists, in a network configured of a plurality of apparatuses to-be-managed (agents) and a managing apparatus (manager), in making it possible to easily incarnate the real time management of a large-scale network in such a way that information indicative of the occurrence of a failure or the change of a status is held in the agent, and that the manager side cyclically acquires the information items of the respective agents so as to acquire actual status information from the agent side only when the failure or the status change has taken place.

A managing apparatus according to the present invention comprises a number-of-times-of-status-changes information acquisition unit, a status change decision unit, a status information acquisition unit, and a status-change information acquisition unit.

An apparatus to-be-managed according to the present invention comprises a number-of-times-of-status-changes information storage unit, a number-of-times-of-status-changes information update unit, a status-change information storage unit, and a status-change information write unit.

According to the first aspect of the present invention, the number-of-times-of-status-changes information acquisition unit acquires from the apparatus to-be-managed the number-of-times-of-status-changes information which indicates the cumulative number of times of status changes of the apparatus to-be-managed. The status change decision unit compares the acquired number-of-times-of-status-changes information, with the number-of-times-of-status-changes information acquired last, so as to decide whether or not any status change has occurred since the last acquisition. The status information acquisition unit acquires the current status information of the apparatus to-be-managed from the apparatus to-be-managed as to which the occurrence of the status change has been decided by the status change decision unit.

According to the second aspect of the present invention, the number-of-times-of-status-changes information storage unit stores therein the number-of-times-of-status-changes information which indicates the cumulative number of times of status changes. The number-of-times-of-status-changes information update unit updates the number-of-times-of-status-changes information stored in the number-of-timesof-status-changes information storage unit, when any status change has occurred.

According to the third aspect of the present invention, the status-change information acquisition unit acquires from the apparatus to-be-managed, status change information which indicates whether or not the status change of the apparatus to-be-managed has occurred. The status information acquisition unit acquires the current status information of the apparatus to-be-managed from the apparatus to-be-managed in which the status change has occurred.

According to the fourth aspect of the present invention, the status-change information storage unit stores therein, status change information which indicates that any status has changed. The status-change information write unit writes the status change information into the status-change information storage unit when the status change has occurred.

BRIEF DESCRIPTION OF THE DRAWINGS

The present invention will be more apparent from the following detailed description, when taken in conjunction with the accompanying drawings, in which:

FIG. 1A is a diagram for explaining the outline of a network management system based on the SNMP;

FIG. 7 is a block diagram showing the construction of a manager apparatus in the first aspect of performance;

FIG. 8 is a flow chart of the process of a polling control unit shown in FIG. 7;

FIG. 9 is a block diagram showing the construction of an agent apparatus in the first aspect of performance;

FIG. 15 is a flow chart of a status alteration process which is executed by an agent process unit shown in FIG. 12;

FIG. 19 is a diagram showing the tree structure of an MIB in the first aspect of performance;

FIG. 20 is a diagram for explaining counter information which is the history information of the MIB, in the first aspect of performance;

FIG. 21 is a diagram showing the contents of the management status information of the MIB;

FIG. 23 is a diagram showing the tree structure of an MIB in the second aspect of performance;

FIG. 24 is a diagram showing flag information which is the history information of the MIB, in the second aspect of performance;

FIG. 30 is a diagram showing the internal arrangements of an LS unit #1 and LS units #2 through #8;

DESCRIPTION OF PREFERRED EMBODIMENT

Now, the present invention will be described in detail with reference to the drawings.

Figure 1B:
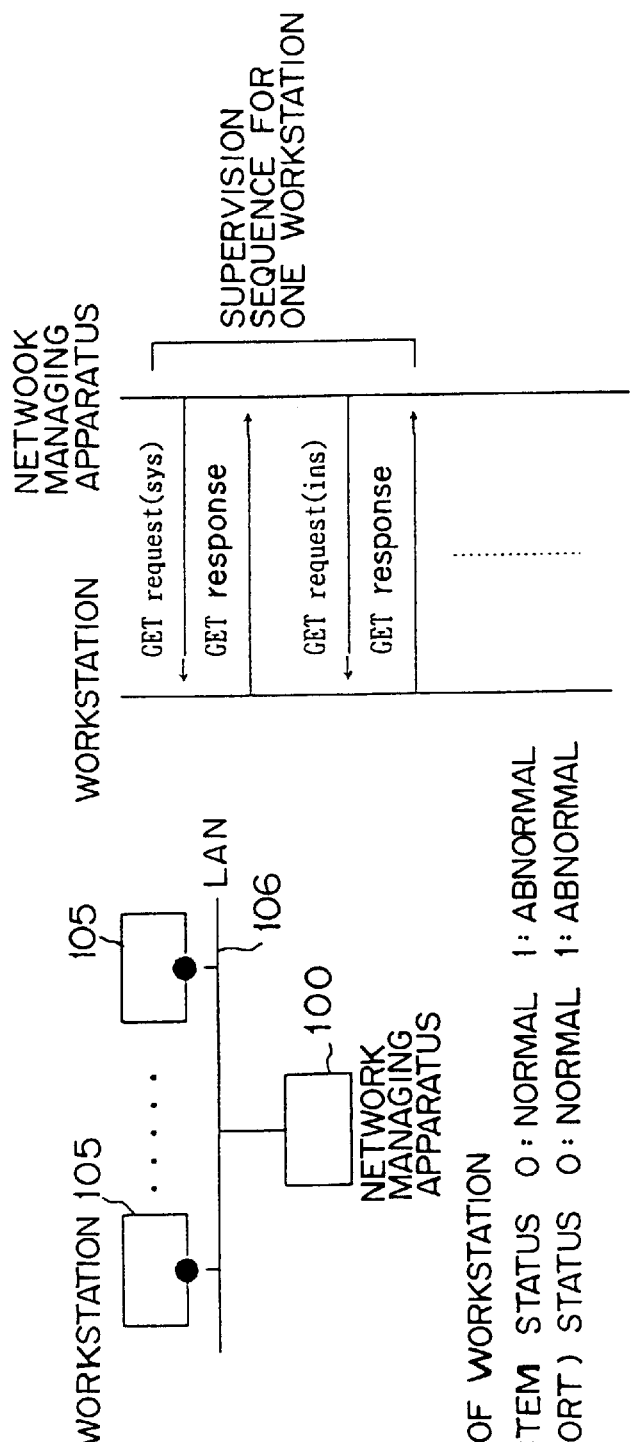
FIG. 1B is a diagram for explaining a prior-art example of a network management system in a local area network which utilizes the SNMP.
Figure 2A:
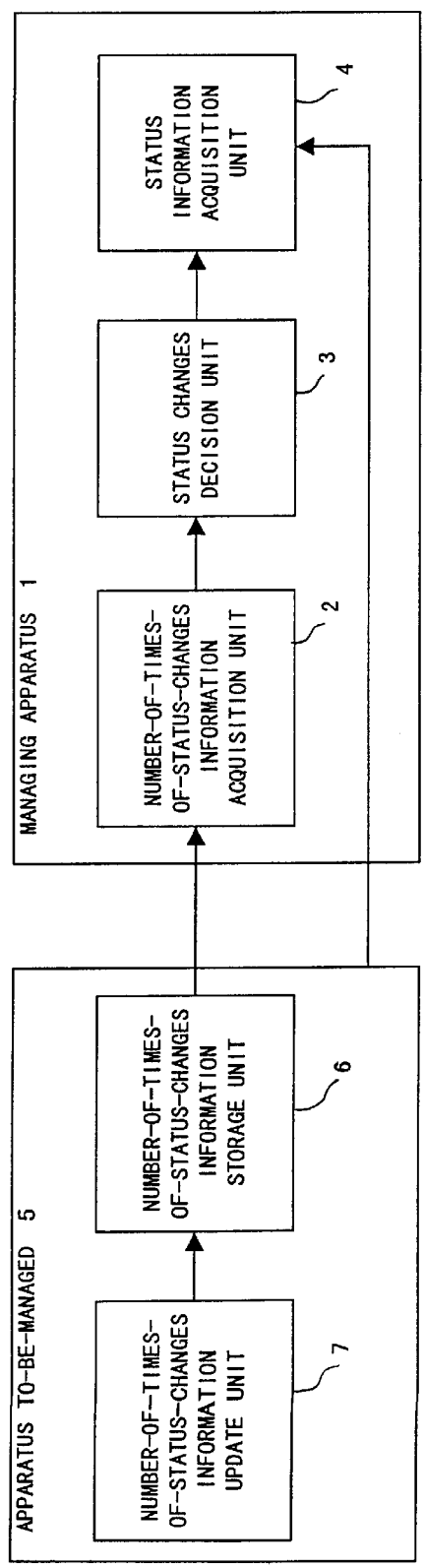
FIG. 2A is a block diagram showing the principle construction of the present invention.

FIG. 2A is a block diagram showing the principle construction of the present invention. It illustrates the principle block arrangements of a managing apparatus and an apparatus to-be-managed on a large-scale network. Here, the managing apparatus manages a plurality of such apparatuses to-be-managed which constitute the network.

Referring to FIG. 2A, the managing apparatus 1 includes therein a number-of-times-of-status-changes information acquisition unit 2, a status change decision unit 3, and a status information acquisition unit 4. On the other hand, the apparatus to-be-managed 5 includes therein a number-of-times-of-status-changes information storage unit 6 and a number-of-times-of-status-changes information update unit 7.

The number-of-times-of-status-changes information acquisition unit 2 included in the managing apparatus 1 acquires the cumulative number of times of status changes in the apparatus to-be-managed 5, for example, counter information from each of the plurality of apparatuses to-be-managed. The status change decision unit 3 compares the number of times of status changes (for example, counter information) acquired, for example, periodically by the number-of-times-of-status-changes information acquisition unit 2, with the number of times of status changes of the identical apparatus to-be-managed 5 acquired last, so as to decide whether or not any status change has occurred since the last information acquisition. Further, the status information acquisition unit 4 acquires the current status information of the pertinent apparatus to-be-managed 5 from the apparatus to-be-managed 5 as to which the occurrence of the status change has been decided by the status change decision unit 3.

The number-of-times-of-status-changes information storage unit 6 included in the apparatus to-be-managed 5 stores therein, number-of-times-of-status-changes information which indicates the cumulative number of times of status changes having occurred in the apparatus 5 itself. Besides, the number-of-times-of-status-changes information update unit 7 updates the number-of-times-of-status-changes information, namely, the cumulative number of times of the status changes and writes the updated information into the number-of-times-of-status-changes information storage unit 6 when the status change of the apparatus 5 itself has taken place.

As stated before, the number of the apparatuses to-be-managed is large in the large-scale network, and the number of status information items on subjects to-be-managed which constitute each of the apparatuses to-be-managed is also large. Therefore, one aspect of performance of the present invention can be constructed and operated as follows: The status information items of each apparatus to-be-managed 5 are assorted into a plurality of groups. Herein, a plurality of sorts of number-of-times-of-status-changes information items, which correspond respectively to the groups and each of which is the cumulative number of times of changes in the status information group, are held on the side of the apparatus to-be-managed 5. The status information acquisition unit 4 of the managing apparatus 1 acquires the current status information of the specified one of the groups among the plurality of sorts of number-of-times-of-status-changes information items, the specified group corresponding to the number-of-times-of-status-changes information as to which the occurrence of the status change has been decided.

Another aspect of performance of the present invention can be constructed and operated as follows: The side of an apparatus to-be-managed includes a status-change information storage unit which stores therein status change information indicative of only the fact that a status in the apparatus itself has changed, and a status-change information write unit which writes the status change information into the status-change information storage unit when the status change of the apparatus itself has occurred. On the other hand, the side of a managing apparatus includes a status-change information acquisition unit which acquires status change information indicative of whether or not any status change in the apparatus to-be-managed has occurred, from each of the plurality of apparatuses to-be-managed, and a status information acquisition unit which acquires the current status information of the pertinent apparatus to-be-managed from the apparatus to-be-managed where the status change has occurred.

Also in such an aspect of performance, it is possible to adopt the contrivance that the status change information items of each apparatus to-be-managed are formed of a plurality of sorts of status change information items which correspond respectively to a plurality of groups as explained before, and that the status information acquisition unit acquires the current status information of the group which corresponds to the status change information indicative of the occurrence of the status change.

As described above, according to the present invention, the managing apparatus is permitted by way of example to periodically acquire the number-of-times-of-status-changes information items or the status change information items on the side of the apparatuses to-be-managed, and to acquire the current status information from only the apparatus to-be-managed where the status change has occurred.

Figure 2B:
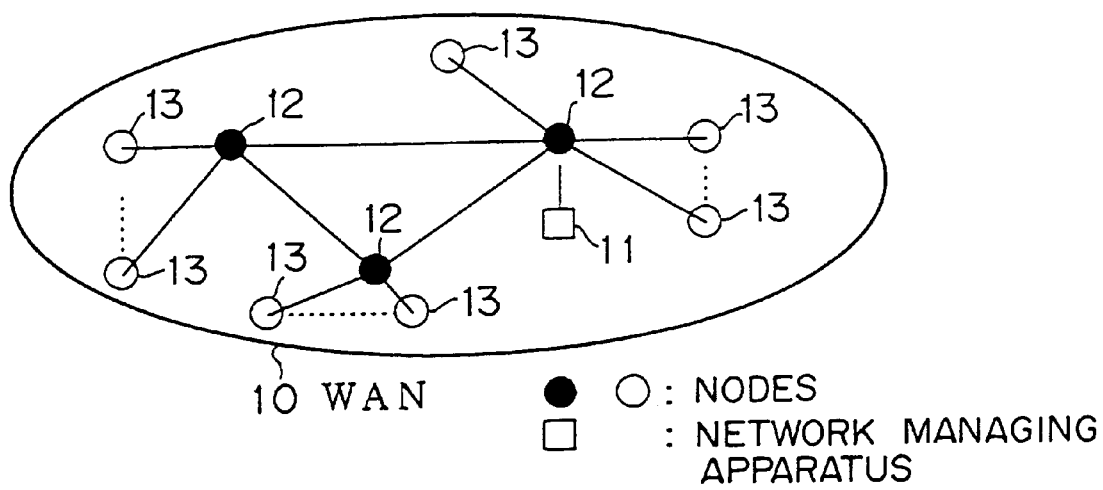
FIG. 2B is a diagram showing an example of the configuration of a wide area network to which the present invention is applied.

FIG. 2B is a diagram for explaining an example of the configuration of a wide area network (WAN) being a large-scale network toward which the present invention is directed. Referring to the figure, the WAN 10 is configured of a plurality of nodes 12, 13, and a network managing apparatus 11 which manages these nodes.

Figure 3:
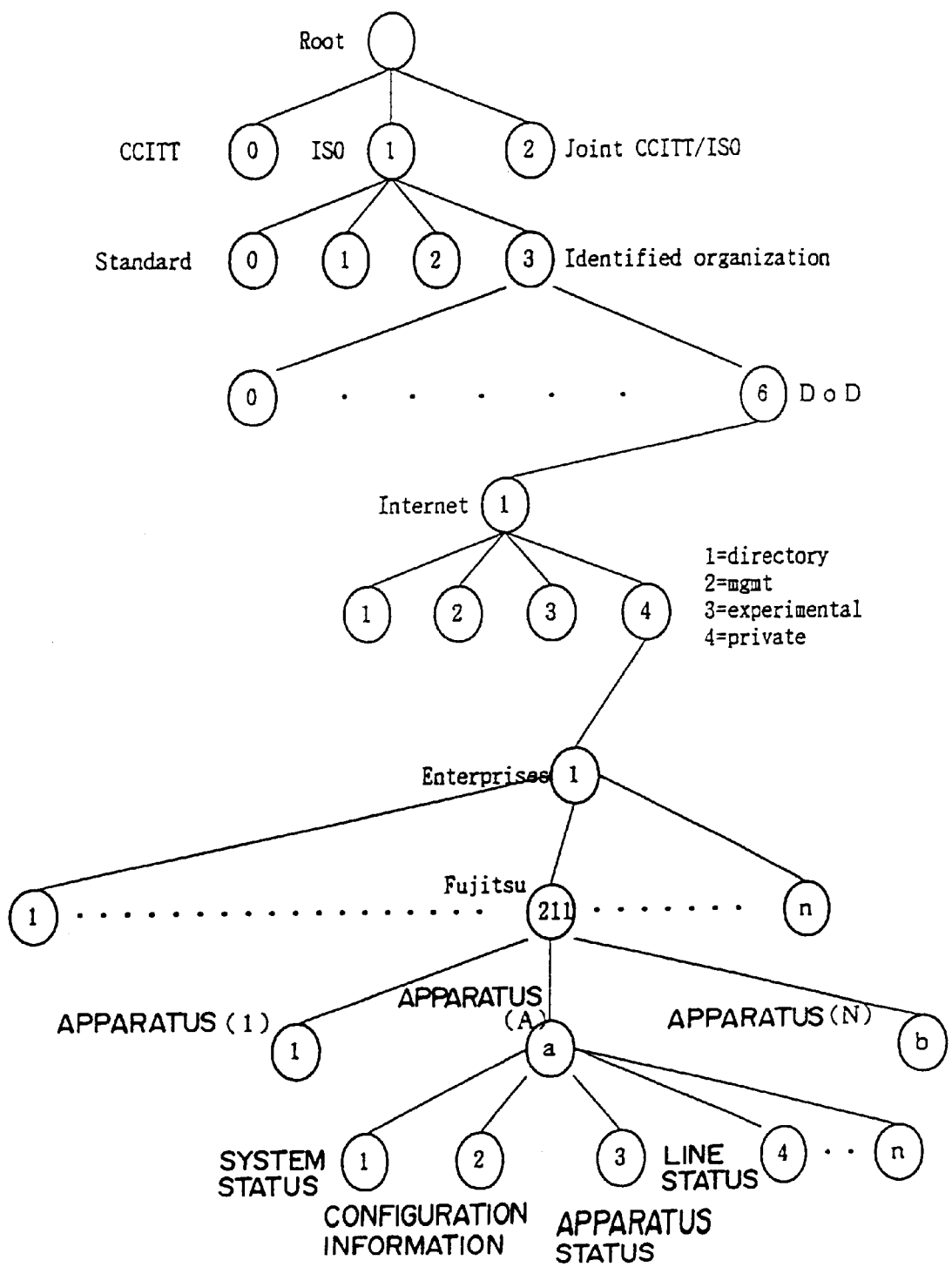
FIG. 3 is a diagram showing the tree structure of MIB information.

FIG. 3 illustrates the tree structure of a management information base (MIB) being a database in which information items to be managed by the network managing apparatus 11 shown in FIG. 2B are accumulated within an apparatus to-be-managed, that is, an agent. The MIB indicates objects defined on each of agents (nodes to-be-managed) which are managed by the simple network management protocol (SNMP) that is a network management protocol in the transmission control protocol/Internet protocol (TCP/IP) forming the basis of the Internet. In the MIB, the relevant ones of the objects are defined as an object group, and MIB modules are collectively defined.

Referring to FIG. 3, the MIB has the tree structure which is managed with branches and leaves, and in which the objects and parameters can be identified. The MIB modules are of the three kinds; "standard", "experimental" and "enterprise specific".

The standard MIB module has been developed by the work group of the Internet Engineering Task Force (IETF), and has been declared to be standard by the internet Engineering Steering Group (IESG). Prefixes for allotting object identifiers to the MIB modules of this kind lie under "mgmt" subtrees.

The experimental MIB module as the second kind is the MIB module which is being developed by the work group, and to which a temporary object identifier is allotted under an experimental subtree.

The enterprise-specific MIB module as the third kind is defined under an enterprise subtree as additional information which is necessary for managing a product peculiar to a vendor.

In FIG. 3, "Fujitsu" being the name of an enterprise is defined under the enterprise subtree, an apparatus A being one of a plurality of apparatuses is defined still under the name of the enterprise, and objects to-be-managed such as a system status, configuration information, an apparatus status and a line status are defined yet under the apparatus A.

Figure 4:
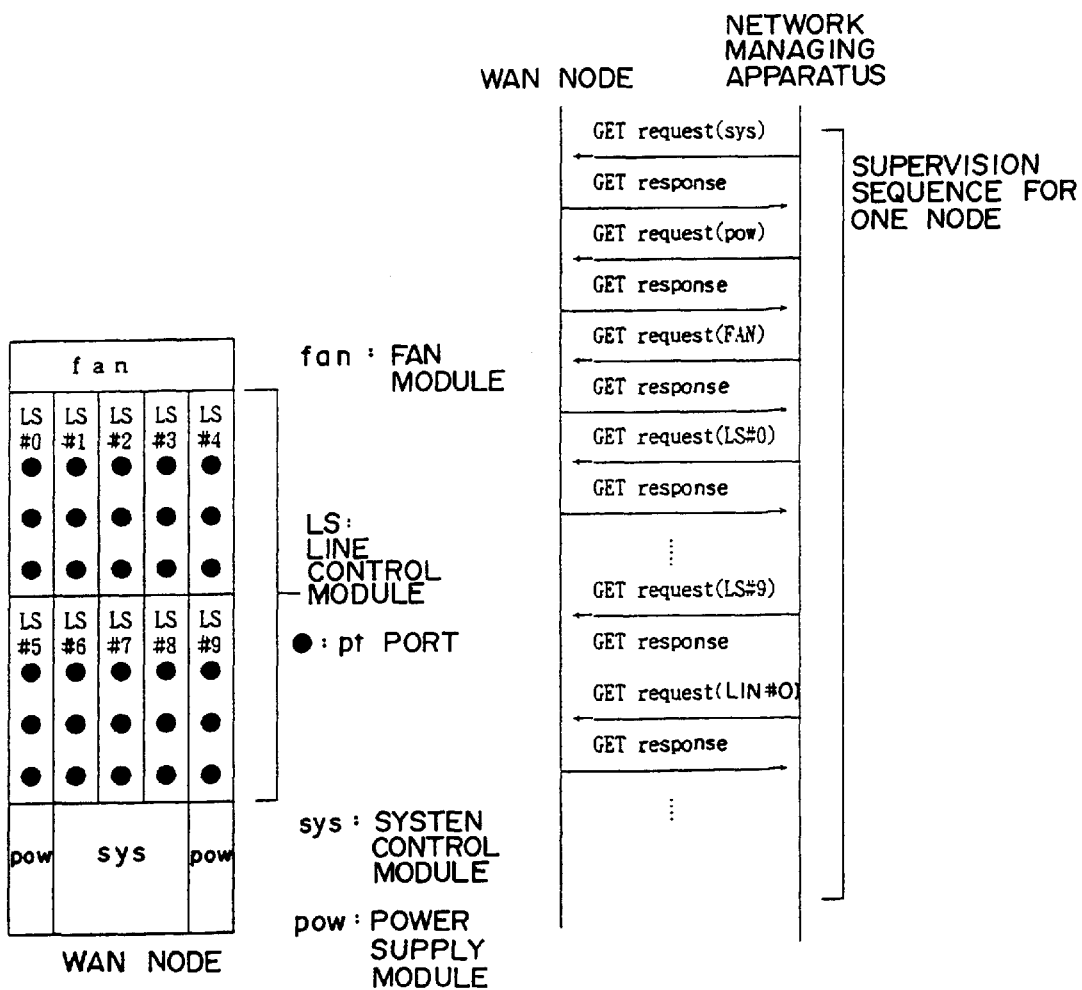
FIG. 4 is a diagram for explaining a fundamental network management system in a wide area network.

FIG. 4 is a diagram for explaining a network management system in a wide area network which employs the MIB information shown in FIG. 3. On the left side of FIG. 4, it is illustrated that a fan module, a line (LS: line set) control module, a system (sys) control module, and a power supply (pow) module, for example, are existent as modules to-be-managed in one WAN node. Illustrated on the right side of FIG. 4 is a supervision sequence for one WAN node as is based on the network managing apparatus 11 shown in FIG. 2B. First, a GET request for querying a system status is sent from the side of the network managing apparatus to the side of the node, and the system status is returned to the network managing apparatus side as a GET response. Thenceforth, the statuses of the power supply module, fan module and line control module are similarly returned to the network managing apparatus side. Further, the statuses of a plurality of lines themselves (LIN) are subsequently returned. Then, the supervision sequence for one node is ended.

Figure 5:
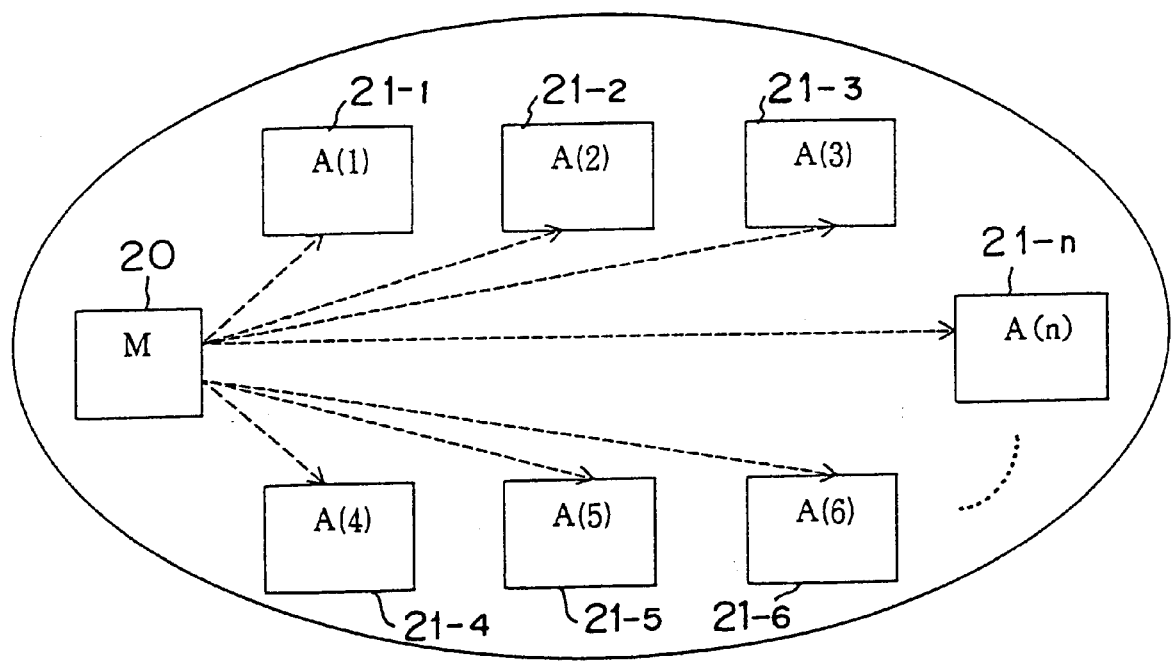
FIG. 5 is a diagram showing a network which is configured of a manager apparatus and agent apparatuses.

FIG. 5 illustrates the configuration of a network which is assumed to be configured of a manager apparatus being a network managing apparatus, and agent apparatuses being apparatuses to-be-managed. In FIG. 5, the plurality of agent apparatuses A(1) 21-1 through A(n) 21-n are managed by the manager apparatus M 20.

Figure 6:
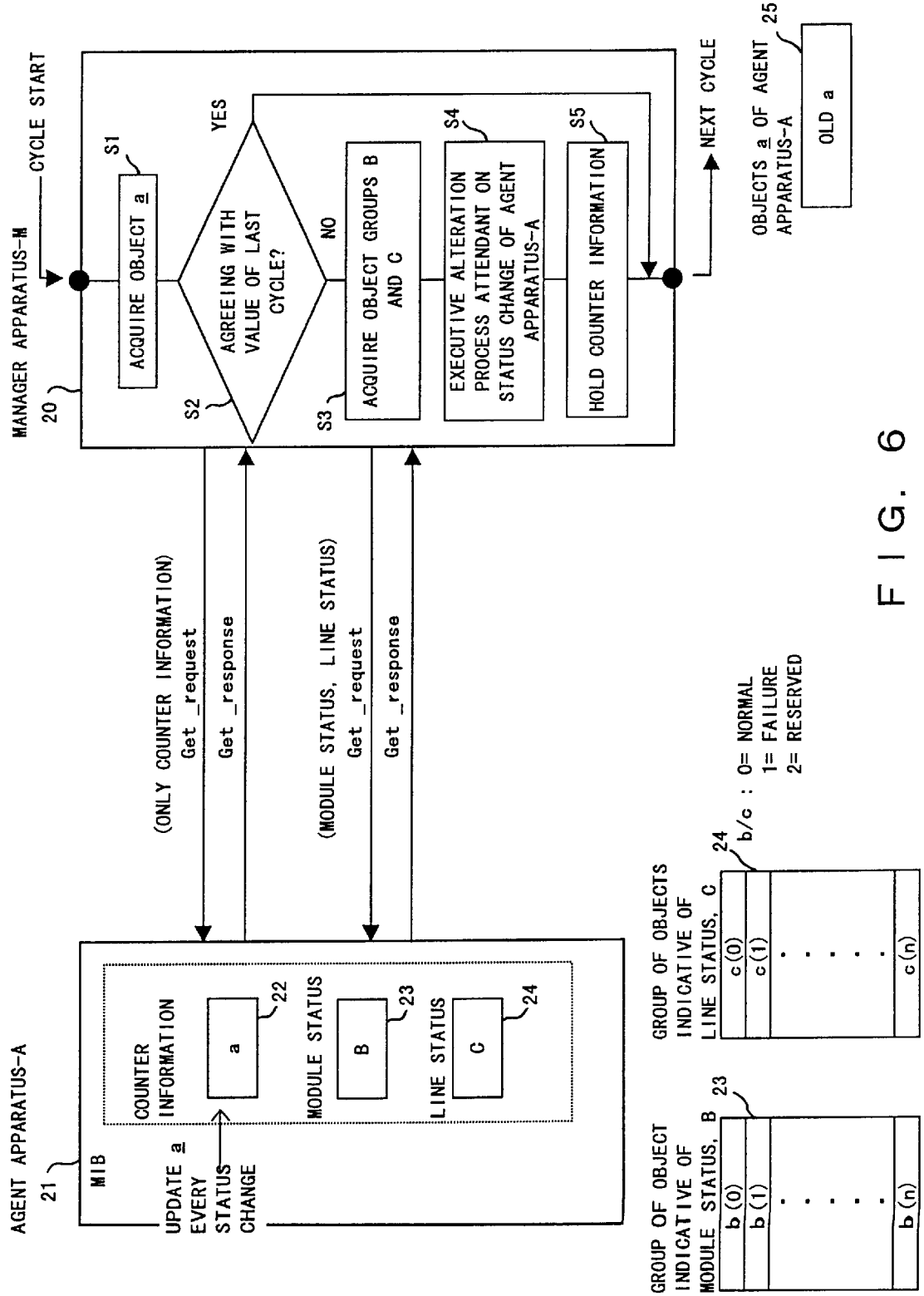
FIG. 6 is a diagram for explaining the fundamental system of network management in the first aspect of performance of the present invention.

FIG. 6 is a diagram for explaining the fundamental process of a management system in the first aspect of performance of the present invention, the management system proceeding between a manager apparatus and one agent apparatus. Referring to FIG. 6, the agent apparatus-A 21 is managed by the manager apparatus-M 20. Held in an MIB included in the agent apparatus-A 21 are an object a 22 indicative of counter information which is incremented when any of statuses to-be-managed has changed, a group B 23 of module status expressing objects, and a group C 24 of line status expressing objects. The object groups B and C each consisting of the (n+1) objects, indicate the (n+1) module status objects and (n+1) line status objects, respectively. The object a is incremented one when either of the module and line statuses has changed once, and it is incremented two when either has changed twice.

The manager apparatus-M 20 is cyclically started. At a step S1, the manager apparatus-M 20 sends a GET request in order to acquire the object a from the agent apparatus-A 21. In compliance with the request, the agent apparatus-A 21 sends the counter information a as a GET response. At a step S2, the manager apparatus-M 20 compares the value of the counter information a currently acquired, with that of the counter information a acquired in the last cycle. On condition that the values do not agree, the processing of the manager apparatus-M 20 advances to a step S3, at which this apparatus sends a GET request to the agent apparatus side in order to acquire the object groups B and C and obtains a GET response as a reply to the request. At a step S4, the manager apparatus-M 20 executes an alteration process attendant upon the change of the status of the agent apparatus-A 21. At a step S5, the manager apparatus-M 20 executes a process for holding the counter information a in the current cycle. The side of the manager apparatus-M 20 is furnished with a memory area for holding the object a of the agent apparatus-A 21, and counter information OLDa 25 is stored in the memory area. Thereafter, or on condition that the value of the counter information a acquired in the current cycle agrees at the step S2 with the value thereof acquired in the last cycle, the current-cycle processing of the manager apparatus-M 20 is ended and is shifted to the processing thereof in the next cycle.

FIG. 7 is a block diagram showing the construction of a manager apparatus in the first aspect of performance of the present invention. Referring to FIG. 7, the manager apparatus 20 is constructed of an operation system 30 which controls the whole apparatus, a graphical user interface (GUI) control unit 31 which executes a screen control etc., a network status management unit 32 which manages the statuses of agent apparatuses included in a network, a polling control unit 33 which acquires MIB information items from the respective agent apparatuses, and an SNMP control unit 34 and a communication control unit 35 which control SNMP communications.

In the polling control unit 33, last-cycl statuses 36-1 through 36-n corresponding to the counter information a in FIG. 6 are held in correspondence with the respective agent apparatuses shown in FIG. 5. The last-cycle statuses of each agent apparatus (for example, the statuses 36-1 of the agent apparatus A(1)) are formed of three counter information items corresponding respectively to a system, a module and a line. An example of the three counter information items is counter information OLDSYS which is incremented when one of a plurality of system statuses has changed.

Further, the statuses 37-1 through 37-n of the respective agent apparatuses are held in the network status management unit 32. The statuses of the respective agent apparatuses are managed in a form, for example, STASYS(k) (k=1, 2, . . . , m) corresponding to the system.

FIG. 8 is a flow chart of processing which is executed by the polling control unit 33. Referring to FIG. 8, when the processing has been started, the plurality of counter values of the agent apparatus A(n) are got at a step S11, the got results being set in work areas, for example, WRKSYS. The subsequent step S12 serves to decide whether or not the system status has changed, that is, whether or not the counter value corresponding to the system status has changed from the last-cycle value. In the presence of the change, the system status STASYS(1) of the agent apparatus A(n) is got at a step S13, so as to update the system status 38 managed by the network status management unit 32. Since the system statuses exist in the number m as shown in FIG. 7, they are got one by one until the system status STASYS(m) is finally updated at a step S14.

Subsequently, the counter value indicative of the system status is updated at a step S15, which is followed by the process of a step S16. In a case where the absence of the change of the system status has been decided at the step S12, the flow of the polling control is immediately shifted to the processing of the step S16.

At the step S16, it is decided whether or not the counter value indicative of the module status has changed. In the presence of the change, at steps S17 through S19, the module statuses of the agent apparatus A(n) are got one by one, the module statuses 39 managed by the network status management unit 32 are updated, and the counter value indicative of the module status is finally updated. In a case where the absence of the change of the module status has been decided at the step S16, the flow of the polling control is immediately shifted to the processing of a step S20.

At steps S20 through S23, similar processing is executed for the line status. That is, when the change in the counter value indicative of the line status has been decided at the step S20, the processing of the steps S21 through S23 is executed, and when not, the polling control processing is immediately ended.

FIG. 9 is a block diagram showing the construction of an agent apparatus in the first aspect of performance. Referring to FIG. 9, the agent apparatus 21 is constructed of module control units 43 which accommodate lines therein, line control units 42 which control the lines, a system status detection unit 44 which detects the status change of the system, a module status detection unit 45 which detects the status change of the module, a line status detection unit 46 which detects the status change of the line, an agent process unit 47 which processes MIB information, an SNMP control unit 48 and a communication control unit 49 which control the SNMP communications, and an operation system 41 which controls the whole agent apparatus 21.

The agent process unit 47 includes an MIB which contains counter information objects 50 and groups 51 of status management objects. The status management object groups 51 are formed of system statuses 52, module statuses 53 and line statuses 54 consisting respectively of m objects.

Figure 10:
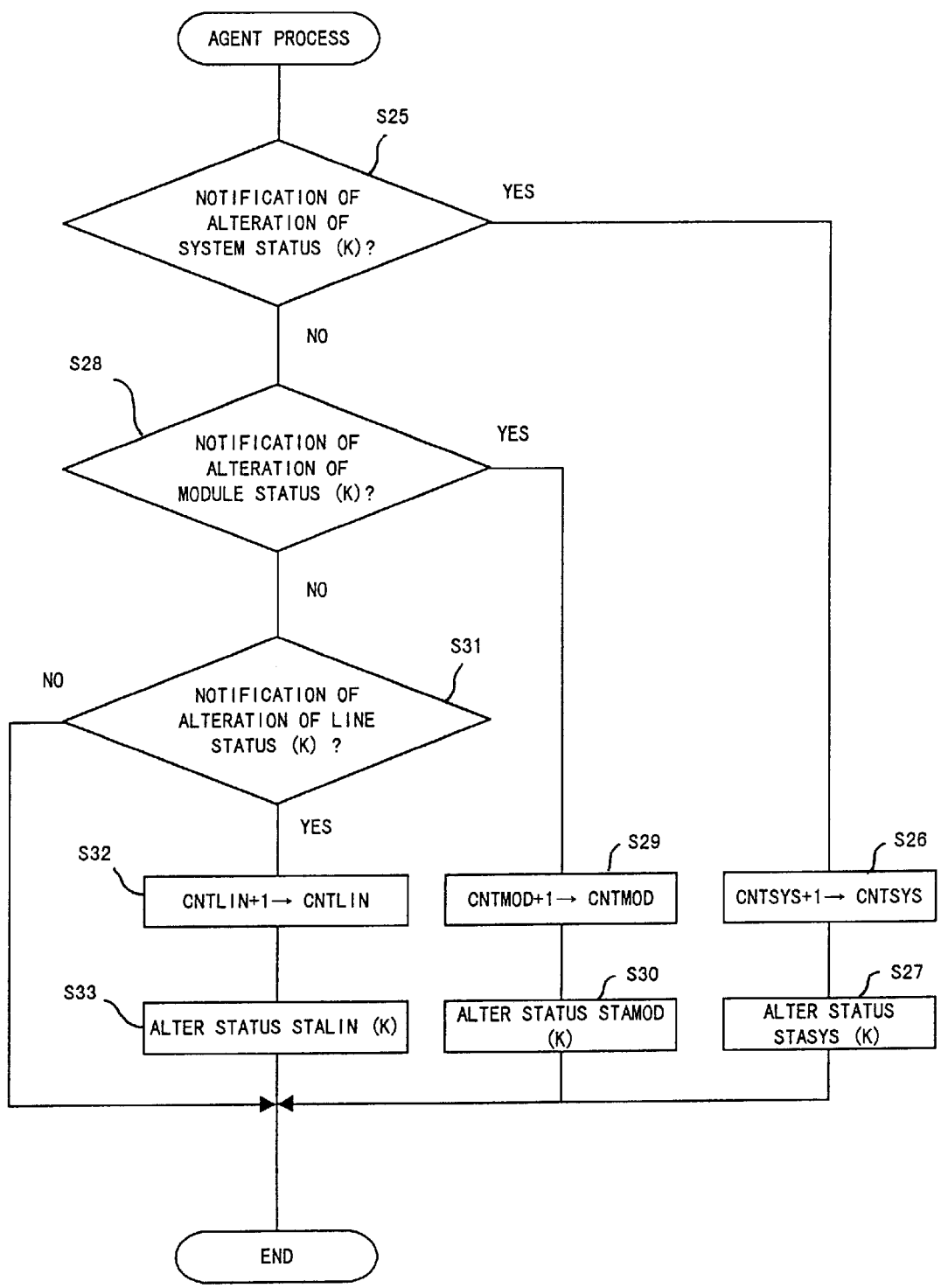
FIG. 10 is a flow chart of the process of an agent process unit shown in FIG. 9.

FIG. 10 is a flow chart of processing which is executed by the agent process unit 47 shown in FIG. 9. Referring to FIG. 10, when the processing has been started, whether or not the alteration of the system status STASYS(k) is notified by the system status detection unit 44 is decided at a step S25. In case of the notification, one of the counter information items 50 corresponding to the system status is incremented at a step S26, and the kth one of the system statuses 52 is altered at a step S27. Then, the processing of the agent process unit 47 is ended.

In a case where the alteration of the system status is not notified at the step S25, whether or not the alteration of the module status STAMOD(k) is notified by the module status detection unit 45 is decided at a step S28. In case of the notification, the value of one of the counter information items 50 corresponding to the module status is incremented at a step S29, and the value of the kth object of the module statuses 53 is altered at a step S30. Then, the processing of the unit 47 is ended.

In a case where the alteration of the module status is not notified at the step S28, whether or not the alteration of the line status STALIN(k) is notified by the line status detection unit 46 is decided at a step S31. In case of the notification, the value of one of the counter information items 50 corresponding to the line status is incremented at a step S32, and the value of the kth object of the line statuses 54 is altered at a step S33. Then, the processing of the unit 47 is ended. On the other hand, in a case where the alteration of the line status is not notified at the step S31, the processing of the unit 47 is ended without any processing.

Figure 11:
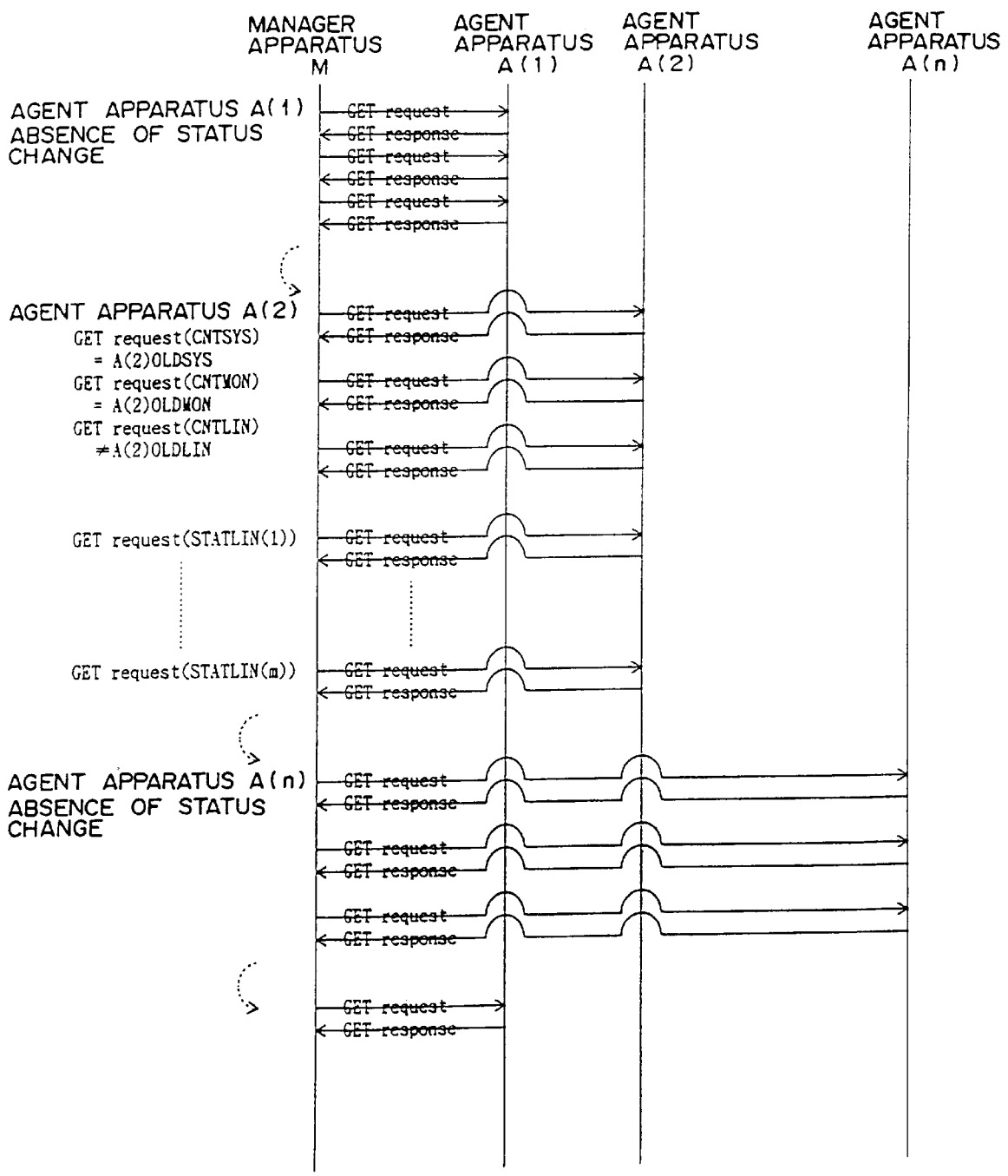
FIG. 11 is a diagram for explaining a network management sequence in the first aspect of performance.

FIG. 11 exemplifies a network management sequence in the first aspect of performance. In the example of FIG. 11, it is assumed that only the line status of the agent apparatus A(2) has changed.

First, the values of the counter information items corresponding to the system status, module status and line status of the agent apparatus A(1) are sent to the manager apparatus M and are compared with the values thereof in the last cycle. Thus, the absence of any status change in the agent apparatus A(1) is decided. Regarding the agent apparatus A(2), when the counter information corresponding to the line status has been sent to the manager apparatus M, it is decided that the current value of the counter information differs from the last value thereof. Subsequently, the objects indicative of the m line statuses are sent from the agent apparatus A(2) to the manager apparatus M, and the values in the memory managed by the network status management unit 32 are updated. Regarding the agent apparatuses, for example, the agent apparatus A(n), the absence of any status change is decided when the three sorts of counter information items have been sent to the manager apparatus M.

As described above in detail, according to the first aspect of performance of the present invention, the manager apparatus periodically supervises only the counter information items held in each agent apparatus. Thus, only when the status changes have occurred on the agent apparatus side, the MIB information items which indicate the statuses after the changes can be acquired for the respective factors of failures, and the load of the manager apparatus can be relieved in the management of the large-scale network. Therefore, the real time management of the network is incarnated, and the manager apparatus can be constructed of a comparatively simple personal computer, a workstation, or the like. Further, since traffic for the management in the network decreases, the steady load of the whole network can be relieved, which is greatly contributive to enhancement in the efficiency of the network management.

Figure 12:
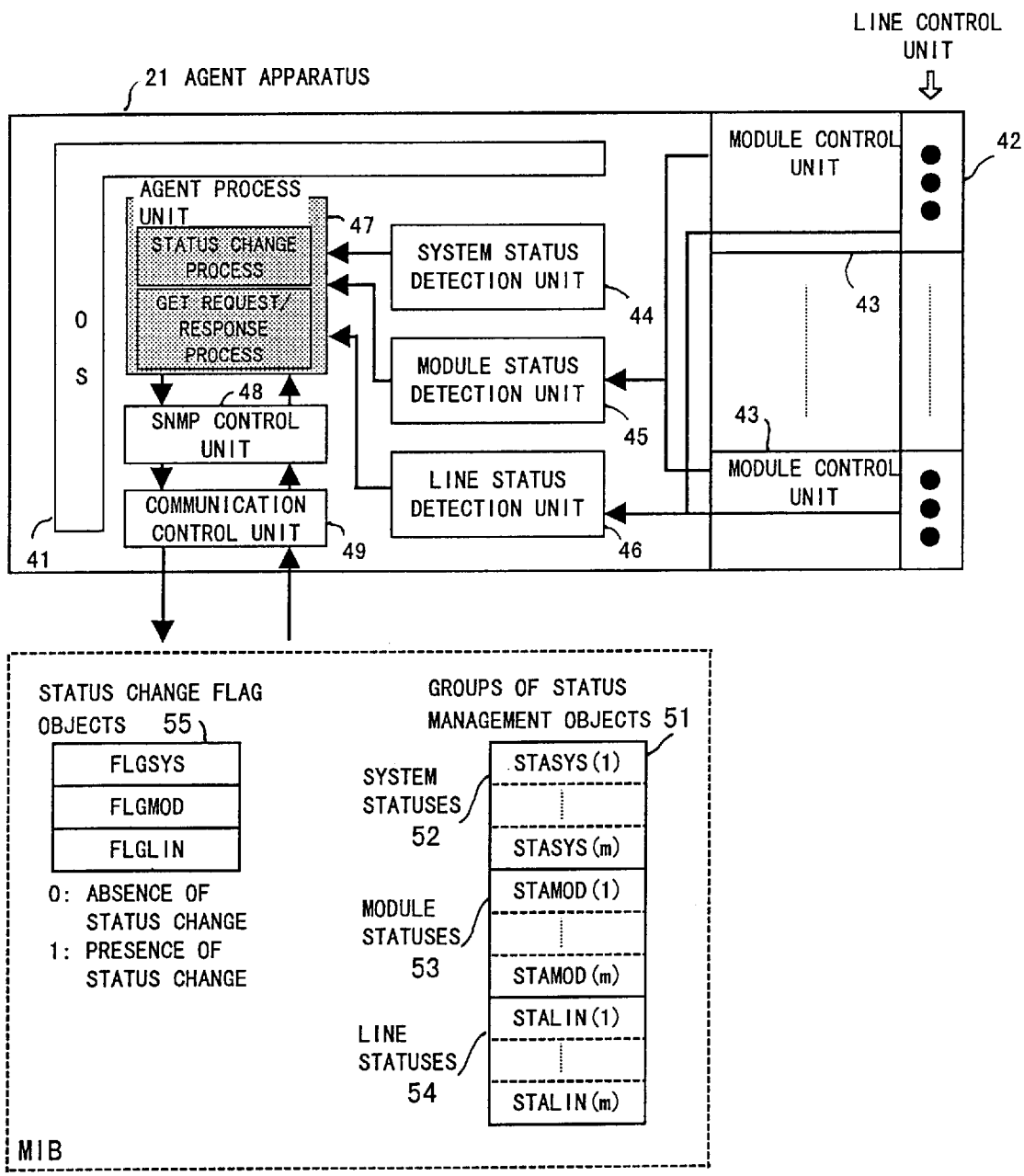
FIG. 12 is a block diagram showing the construction of an agent apparatus in the second aspect of performance.

FIG. 12 is a block diagram showing the construction of an agent apparatus in the second aspect of performance of the present invention. In this second aspect of performance, information items which are held in the MIB instead of the counter information items in the first aspect of performance are status change flag objects 55 indicative of status change flags whose values are set to "1" at the occurrences of status changes. The second aspect of performance will be described chiefly on the points thereof differing from the first aspect of performance.

As understood by comparing FIG. 12 with FIG. 9, the contents of the status management object groups 51 and the block arrangement of the agent apparatus 21 are the same. However, a status alteration process and a GET request/response process which are executed in the agent process unit 47 are partly different from the corresponding processes in the first aspect of performance. These points will be explained later.

Figure 13:
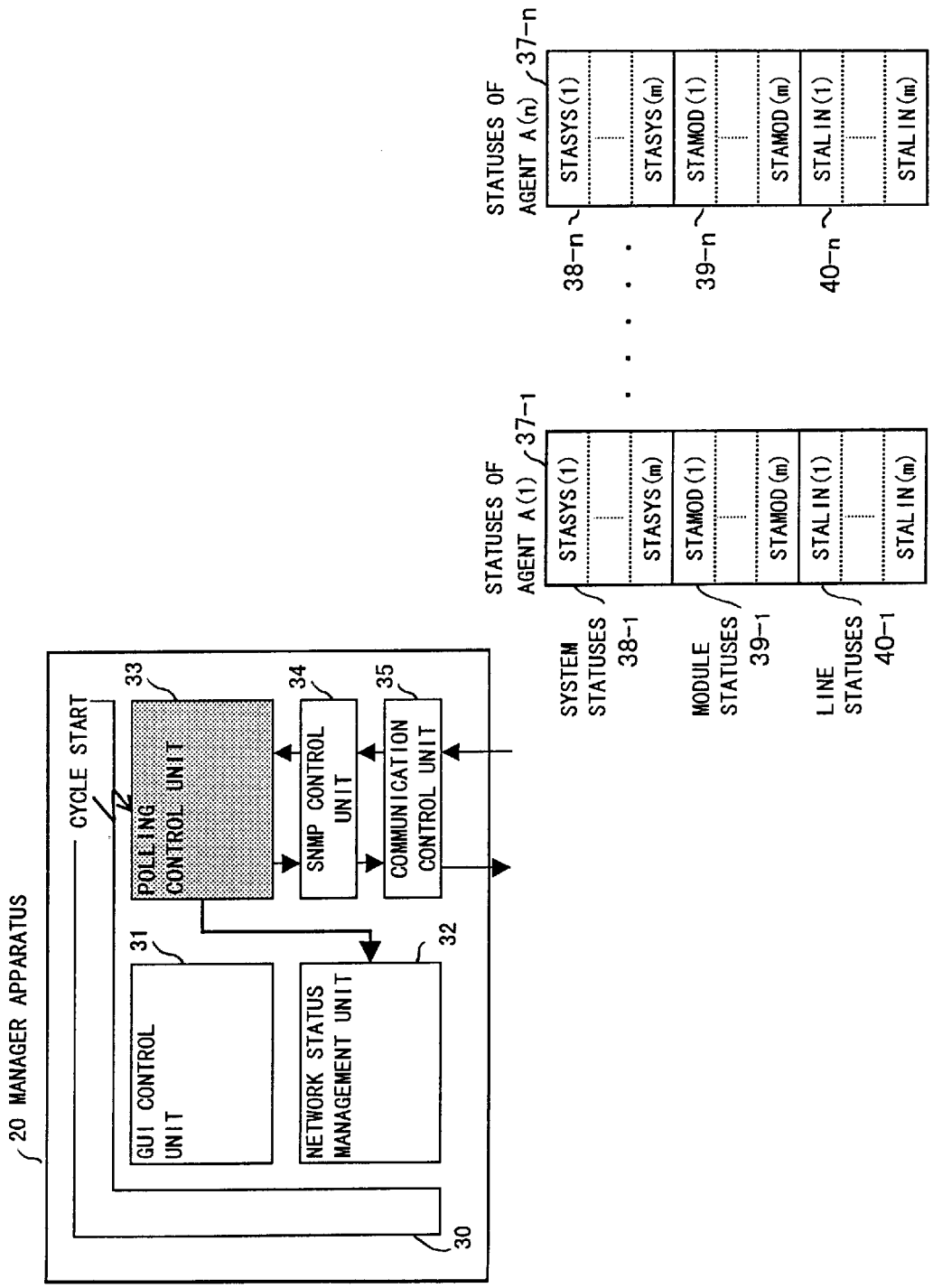
FIG. 13 is a block diagram showing the construction of a manager apparatus in the second aspect of performance.

FIG. 13 is a block diagram showing the construction of a manager apparatus in the second aspect of performance. Referring to FIG. 13, the block arrangement of the manager apparatus 20 is the same as in the first aspect of performance shown in FIG. 7. However, in the construction of FIG. 7, the last-cycle counter information items of the respective agent apparatuses are held in the polling control unit 33, whereas in the construction of FIG. 13, the last-cycle values of the flags corresponding to the last-cycle counter information items need not be held, and merely the statuses of the respective agent apparatuses are held in the network status management unit 32.

Figure 14:
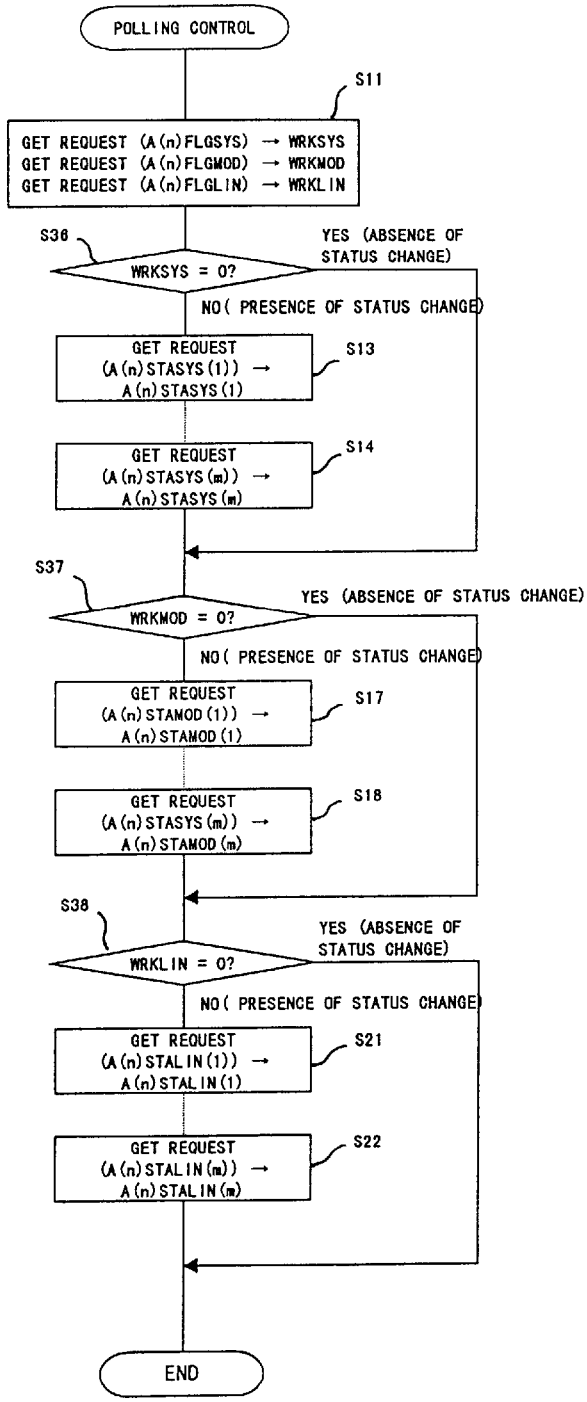
FIG. 14 is a flow chart of the process of a polling control unit shown in FIG. 13.

FIG. 14 is a flow chart of processing which is executed by the polling control unit of the manager apparatus in the second aspect of performance. As understood by comparing FIG. 14 with FIG. 8 in the first aspect of performance, the processing which is executed is substantially the same. As an example of difference, however, at the step S12 in FIG. 8, the values of the counter information are compared to decide whether or not the system status has changed, whereas at a step S36 in FIG. 14, the presence or absence of the status change is decided in accordance with the value "1" or "0" of the flag. Likewise, the presence or absence of the change of the module status and that of the change of the line status are respectively decided at steps S37 and S38 in accordance with the contents of the flags. Besides, the processes of the step S15 etc. for updating the counter information items are naturally dispensed with.

FIG. 15 is a flow chart of a status alteration process which is executed by the agent process unit shown in FIG. 12, in the second aspect of performance. As understood by comparing FIG. 15 with FIG. 10 in the first aspect of performance, an example of difference is that, at a step S40 in FIG. 15, "1" is set as the value of the flag corresponding to the system status, subject to the notification of the alteration of this status, and instead of the process for incrementing the counter value at the step S26 in FIG. 10. Likewise, the values of the flags corresponding to the module status and the line status are respectively set to "1" at steps S41 and S42.

Figure 16:
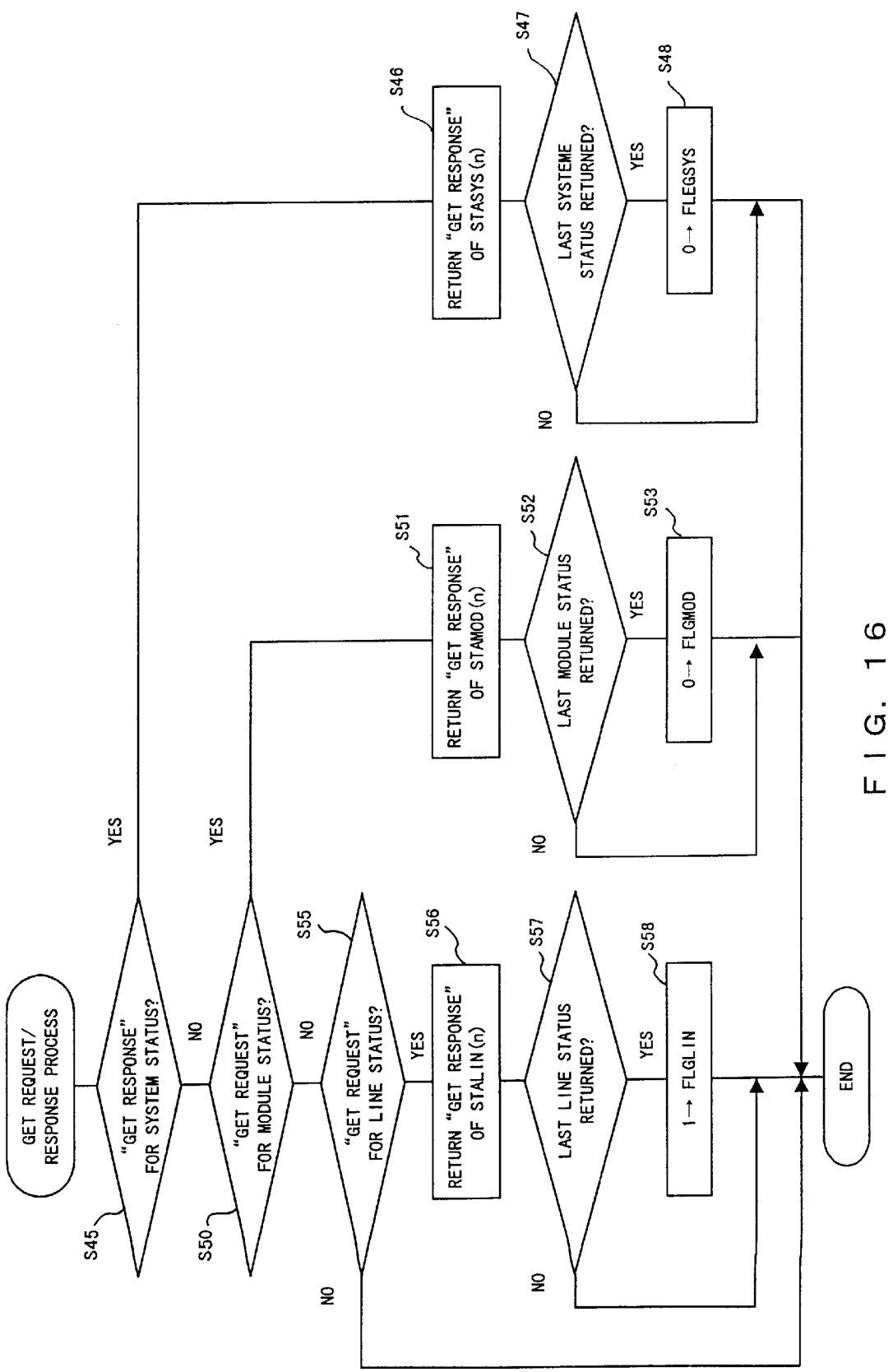
FIG. 16 is a flow chart of a GET request/response process which is executed by the agent process unit shown in FIG. 12.

FIG. 16 is a flow chart showing the GET request/response process which is executed by the agent process unit 47 depicted in FIG. 12. Referring to FIG. 16, when the process has been started, whether or not a GET request for the system status has been issued by the manager apparatus is decided at a step S45. In case of the request for the system status, a GET response for the system status STASYS(1) among the system statuses is returned at a step S46, and whether or not the returned system status is the last one is decided at a step S47.

As explained in conjunction with FIG. 12, the system statuses exist in the number m. Also, as explained in conjunction with FIG. 14, in the case where the presence of the change in the system status has been decided in accordance with the value of the flag, the GET requests are sent from the manager apparatus to the agent apparatus m times in correspondence with the m system statuses, and the m system statuses are returned to the manager apparatus one by one. Here in the description of the process shown in FIG. 16, merely the system status STASYS(1) of the system statuses has been returned. Therefore, it is decided at the step S47 that the returned system status is not the last one. Then, the processing of the response to the GET request concerned is ended.

While the returns of the m system statuses to the manager apparatus are proceeding, the processing of the steps S45 et seq. is iterated in correspondence with the GET requests made by the manager apparatus. On condition that the GET response of the system status STASYS(m) has been returned at the step S46, it is decided at the step S47 that the returned system status is the last one, and the value of the flag FLGSYS which indicates the status change corresponding to the system status is set to "0" at a step S48, whereupon the process is ended.

In case of the decision at the step S45 in FIG. 16 that the request is not for getting the system status, whether or not the request is for getting the module status is decided at a step S50. In case of the GET request for the module status, the return of the GET response of the module status is executed at steps S51 through S53 similarly to the return of the GET response of the system status at the steps S46 through S48.

In case of the decision at the step S50 that the request is not for getting the module status, whether or not the request is for getting the line status is decided at a step S55. In case of the GET request for the line status, the return of the GET response of the line status is executed at steps S56 through S58 similarly to the return of the GET response of the system status or module status. On the other hand, in case of the decision at the step S55 that the request is not for getting the line status, the process is ended without any disposition.

As described above in detail, according to the second aspect of performance of the present invention, the manager apparatus periodically supervises only the flag information items held in each agent apparatus. Thus, only when the status changes have occurred on the agent apparatus side, the MIB information items which indicate the statuses after the changes can be acquired for the respective factors of failures, and the load of the manager apparatus can be relieved in the management of the large-scale network. Therefore, the real time management of the network is incarnated, and the manager apparatus can be constructed of a comparatively simple personal computer, a workstation, or the like. Further, since traffic for the management in the network decreases, the steady load of the whole network can be relieved, which is greatly contributive to enhancement in the efficiency of the network management.

Figure 17:
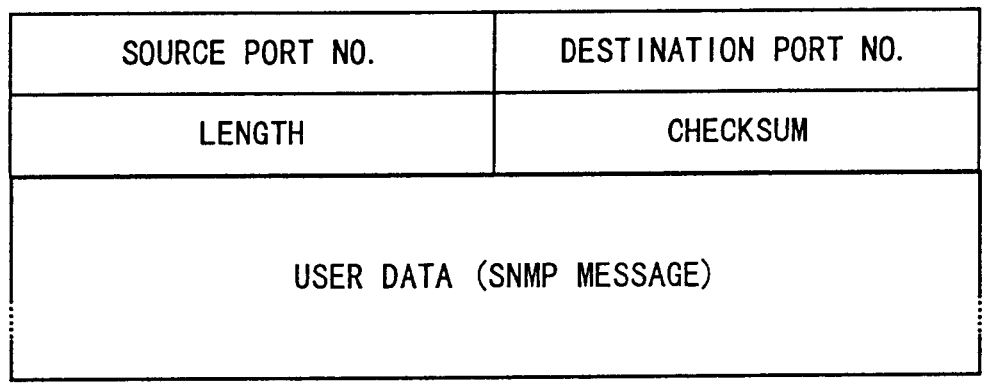
FIG. 17 is a diagram showing a data format in the user data protocol (UDP)

Next, there will be described a process employing an SNMP message which is communicated between the manager apparatus and the agent apparatus in order to notify, e.g., the counter information or the status change information in the first or second aspect of performance of the present invention. FIG. 17 is a diagram for explaining a data format in the user data protocol (UDP) which is the subordinate protocol of the SNMP. In the SNMP communications, the UDP is used as the subordinate protocol, and the SNMP message to be transferred is borne in the user data part of the data format of the UDP as shown in FIG. 17.

Figure 18:
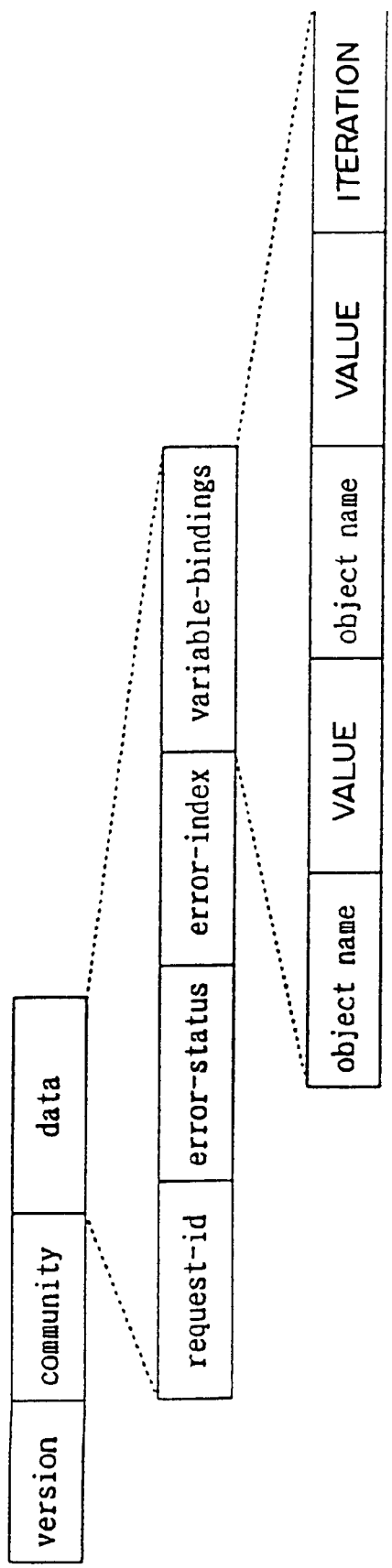
FIG. 18 is a diagram showing the structure of an SNMP message.

FIG. 18 illustrates the structure of the SNMP message. Referring to FIG. 18, at the parts of the message other than data, an integer "0" indicative of "version 1" is always set as a version, and the group name of the agent and the manager is set as a community.

As a "request-id" in the data, the manager apparatus sets a value in sending a GET request to the agent apparatus, and the agent apparatus sets the same value in a GET response complying with the GET request. An "error status" is used for notification from the agent apparatus to the manager apparatus when an error is contained in the SNMP message for a request made by the manager apparatus. To be set in an "error index" is an offset for indicating "variable-bindings" for an object as to which the error is contained in the requesting SNMP message.

The "variable-bindings" indicate actual objects, and the names and values of the objects are arrayed in pairs. In general, one or more objects, for example, several objects are defined in consideration of the compliancy of the process which is executed between the manager apparatus and the agent apparatus, the length of the data, and so forth.

FIG. 19 illustrates the tree structure of the MIB in the first aspect of performance. In the figure, history information on the apparatus to-be-managed is the counter information explained before.

FIG. 20 illustrates the history information, namely, counter information contained in the MIB in the first aspect of performance. The information items express, for example, the names of the three objects which correspond respectively to the system status, module status and line status.

FIG. 21 illustrates those contents of the MIB which indicate the system status, module status and line status serving as the information items to-be-managed in the first aspect of performance. The object names, etc. of the m objects are listed in correspondence with each of the system status, module status and line status.

Figure 22:
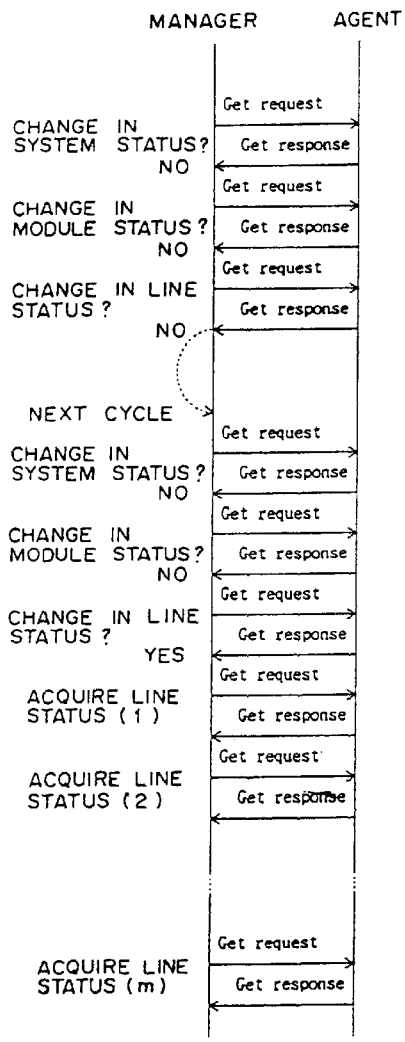
FIG. 22 is a diagram for explaining a supervision sequence which uses an SNMP message, in the first aspect of performance.

FIG. 22 exemplifies the supervision sequence which proceeds between the manager apparatus and the agent apparatus in the first aspect of performance, and the contents of the SNMP messages which correspond to this supervision sequence. In the first cycle of polling, the respective count values which indicate the system status, module status and line status are "1", and the absence of any status change is decided. In contrast, in the next cycle of polling, the count value which corresponds to the line status becomes "2", and the presence of a change in the line status is decided, so that the values of the m objects indicative of the line statuses are acquired.

FIG. 23 illustrates the tree structure of the MIB in the second aspect of performance. As compared with the tree structure in FIG. 19, the tree structure in FIG. 23 differs in the point that the flag information replaces the history information, namely, counter information in FIG. 19.

FIG. 24 illustrates those contents of the MIB which are the flag information serving as the history information in the second aspect of performance. The information items express, for example, the object names of the flags which correspond respectively to the system status, module status and line status.

Figure 25:
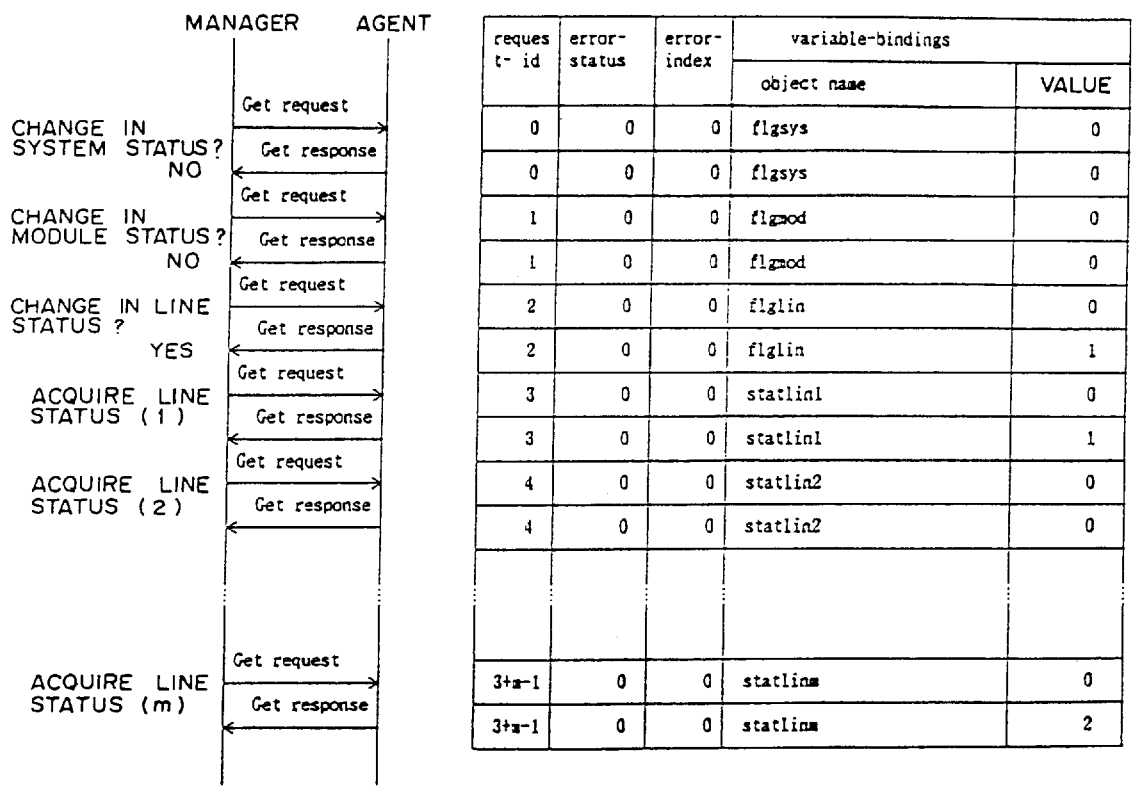
FIG. 25 is a diagram for explaining a supervision sequence which uses an SNMP message, in the second aspect of performance.

FIG. 25 exemplifies the supervision sequence which proceeds between the manager apparatus and the agent apparatus in the second aspect of performance, and the contents of the SNMP messages which correspond to this supervision sequence. When compared with the supervision sequence in FIG. 22 as corresponds to the first aspect of performance, the supervision sequence in FIG. 25 differs in the point that the presence of a change in the line status is decided from the value "1" of the flag indicative of the line status, whereupon the m objects indicative of the line statuses are acquired.

Figure 26:
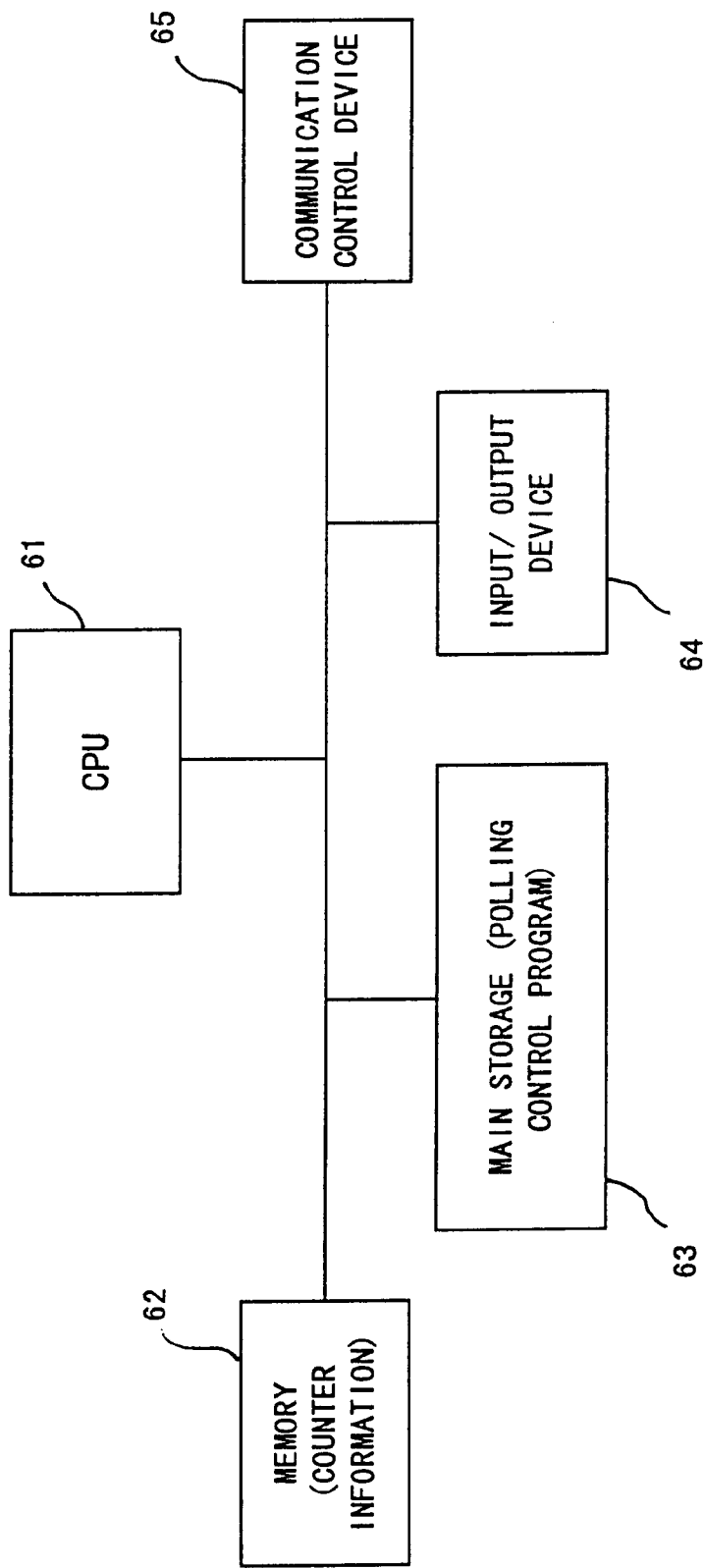
FIG. 26 is a block diagram showing the architecture of a computer system for incarnating network management.

FIG. 26 is a block diagram showing the architecture of a computer system for realizing a network managing apparatus, namely, a manager apparatus, or an apparatus to-be-managed, namely, an agent apparatus in the present invention. Referring to FIG. 26, the computer system is constructed of a central processing unit (CPU) 61 which controls the whole system, a memory 62 which stores therein, for example, counter information items in the last cycle or objects indicative of the statuses of each agent apparatus, a main storage 63 in which a program for a polling process, for example, is temporarily stored for the execution thereof by the CPU 61, an input/output device 64 which serves to input or output, for example, polling cycle data, and a communication control device 65 which serves to establish SNMP communications.

Figure 27:
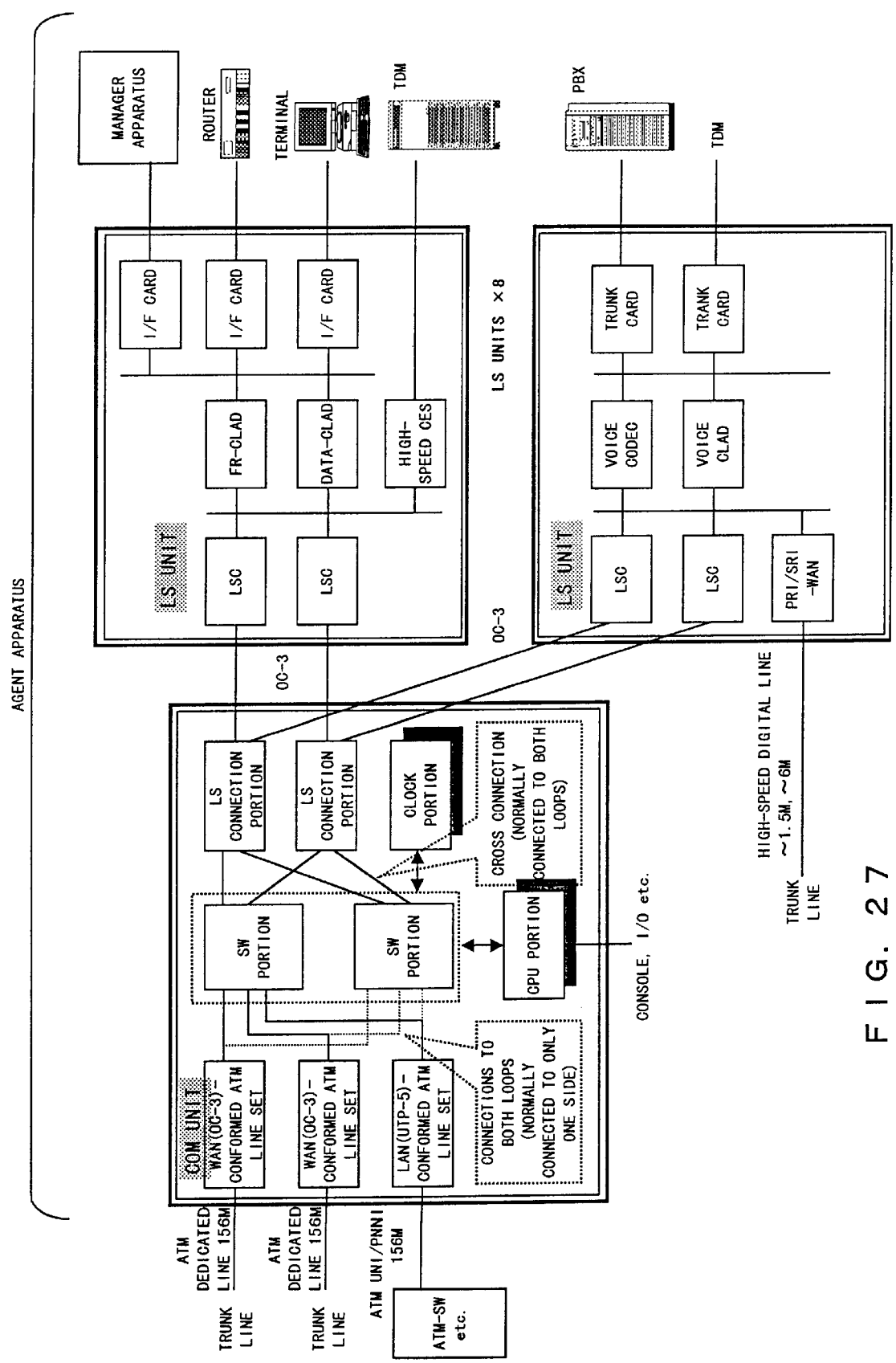
FIG. 27 is a diagram showing an example of the configuration of an ATM-WAN to which the present invention can be applied.

FIG. 27 illustrates an example of the configuration of an ATM-WAN to which the present invention can be applied. An agent apparatus is constructed of a COM unit (SYS) which includes switch portions (SW portions), a CPU portion, etc., and LS units which are in the number of 8. The LS units have a router, various terminals, a PBX, etc. connected thereto, and are also connected with a manager apparatus. Various kinds of data, such as voice data and coded data, are transferred from the terminals to the agent apparatus.

Figure 28:
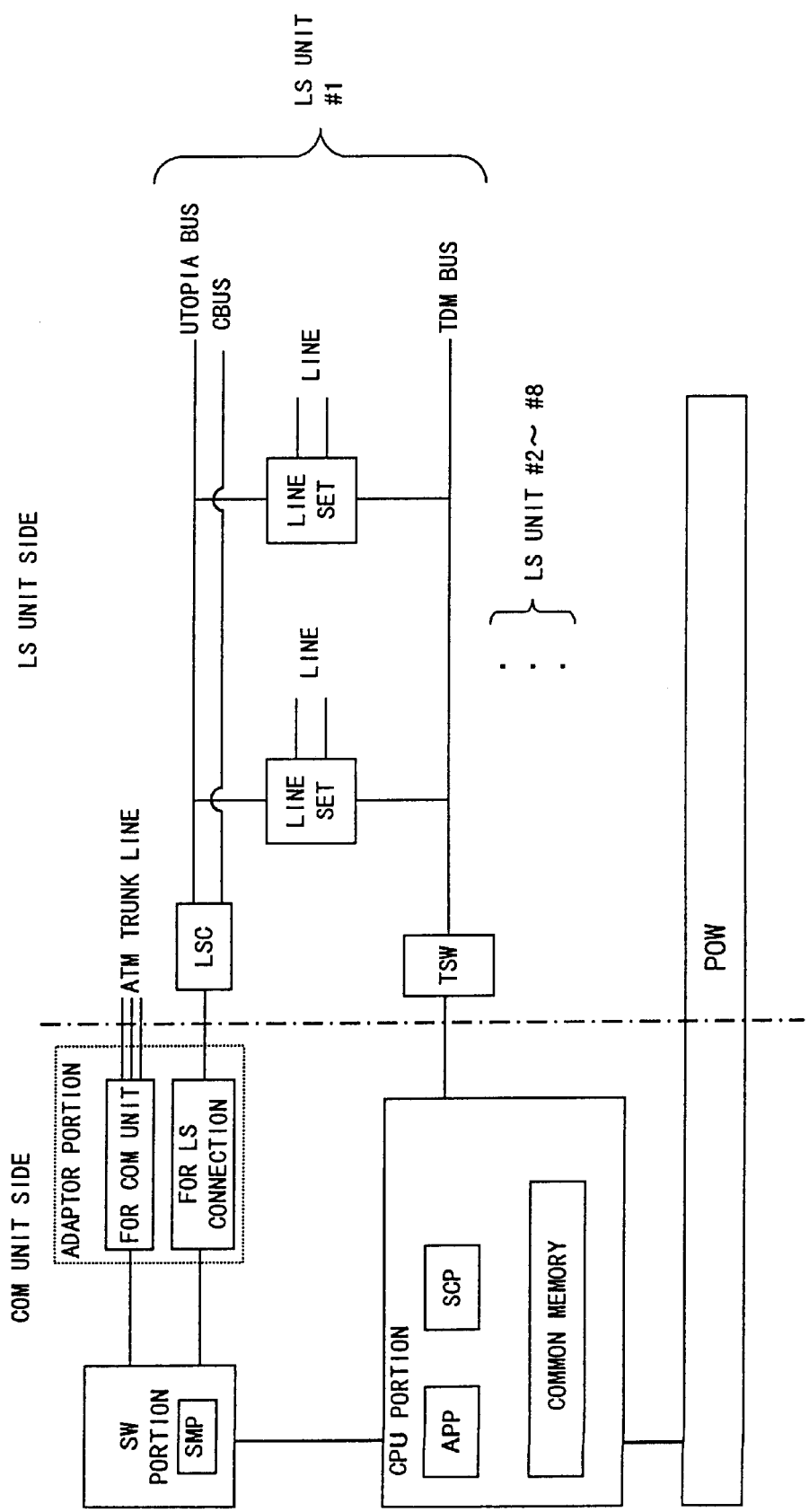
FIG. 28 is a diagram showing the hardware architecture of an agent apparatus that is an apparatus to-be-managed as a node constituting an ATM-WAN to which the present invention can be applied.

FIG. 28 is a diagram showing the hardware architecture of an agent apparatus that is an apparatus to-be-managed as a node constituting an ATM-WAN to which the present invention can be applied. Voice data, high-speed data, low-speed data, etc. which have been transmitted in through lines, are assembled into cells by line sets. The cells are multiplexed by a Utopia bus, and are switched in the ATM. The system statuses and module statuses in the present invention, the counter information items in the first aspect of performance of the present invention, and the flag information items in the second aspect of performance of the present invention are kept stored in a common memory which is included in a CPU portion. The system and module statuses, the counter information items, and the flag information items are processed by an APP (Application Program Processor) which executes protocol processes, application processes, etc.

Figure 29:
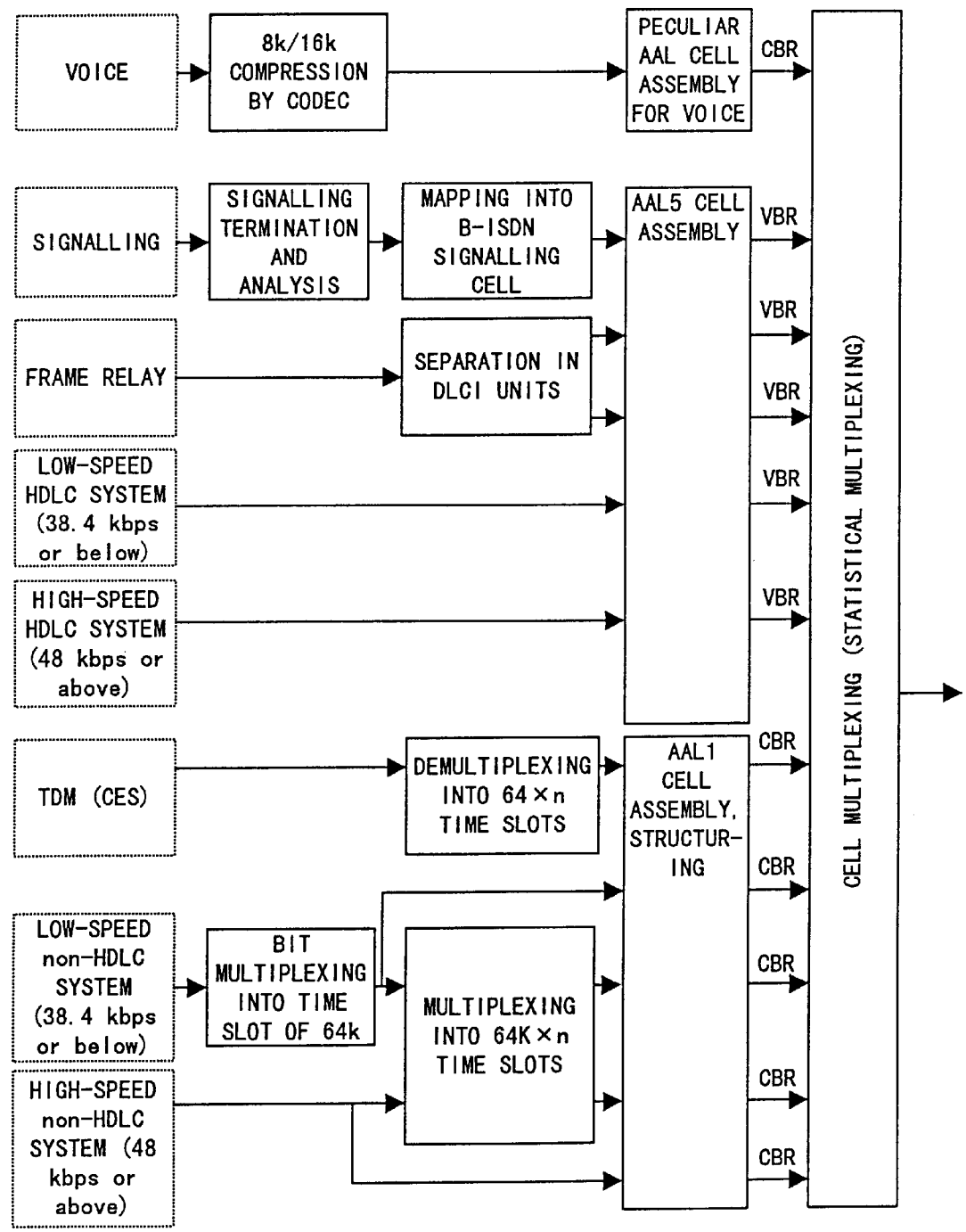
FIG. 29 is a diagram showing the mechanism of the cell multiplexing of voice data, high-speed data, low-speed data, etc.

FIG. 29 is a diagram showing the mechanism of the cell multiplexing of voice data, high-speed data, low-speed data, etc. By way of example, the voice data are compressed and are thereafter assembled into cells in accordance with a peculiar AAL (ATM Adaptation Layer) protocol. The resulting cells are multiplexed together with data assembled into cells in accordance with the AAL5 protocol (a protocol for the traffic of VBR (Variable Bit Rate) as has been prescribed by the ATM Forum, and as aims at satisfying the requests of the users of a high-speed connection type data service on the basis of reduction in overhead and improvements in an error protection function) and the AAL1 protocol (a protocol for the traffic of CBR (Constant Bit Rate) sensitive to a delay and the loss of a cell).

FIG. 30 is a diagram showing the internal arrangements of an LS unit #1 and LS units #2 through #8. The LS unit #1 includes constituents TSW #0 and TSW #1, and differs in this point from the LS units #2 through #8 not including them. The constituents TSW #0 and TSW #1 are the time switches of respective systems in a dual structure, and they are shared with the LS units #2 through #8.

Figure 31:
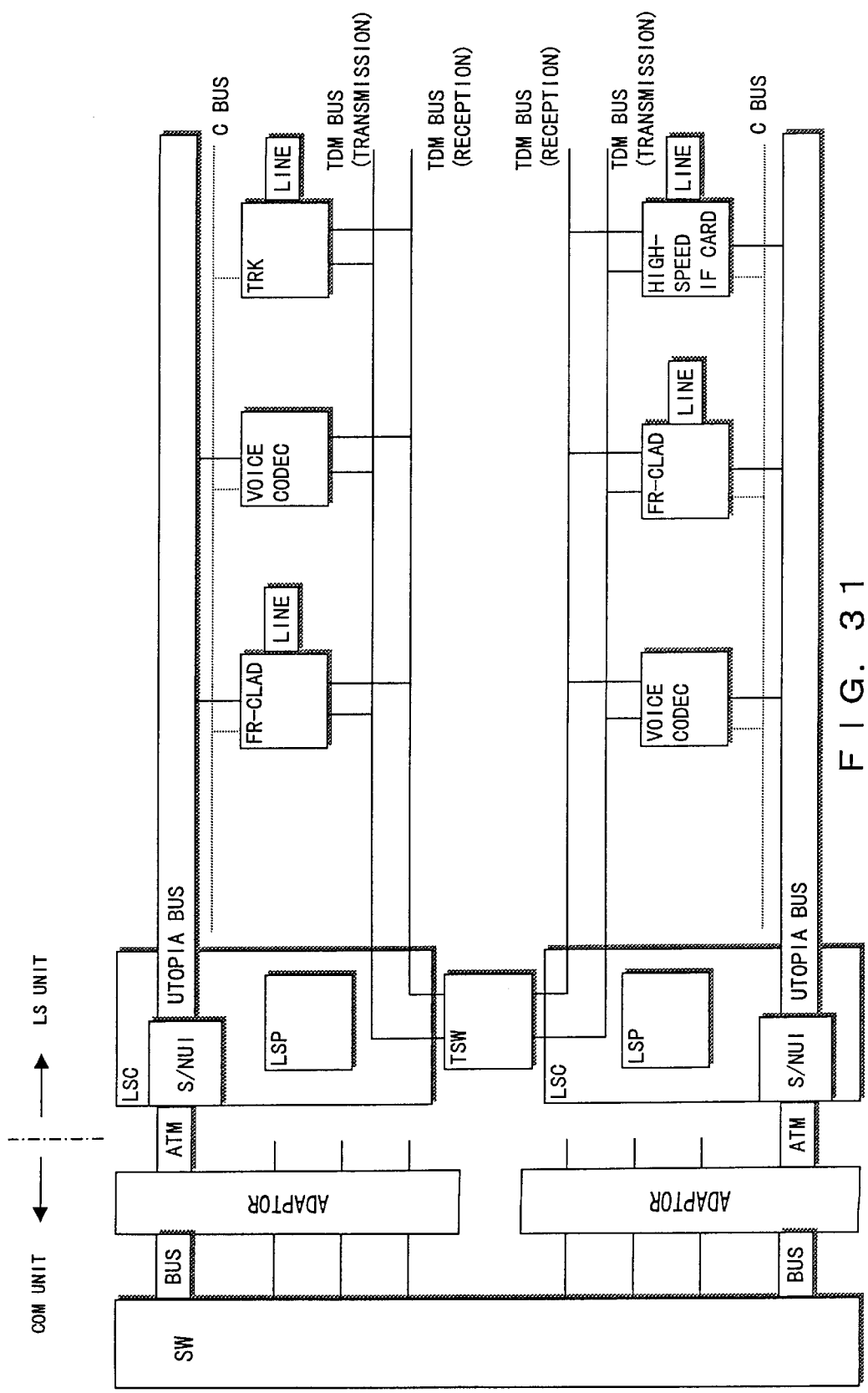
FIG. 31 is a diagram showing an arrangement in which a plurality of LS units share a single time switch TSW.

FIG. 31 is a diagram showing an arrangement in which a plurality of LS units share a single time switch TSW. Although only the two LS units are depicted in FIG. 31, the number of the LS units is usually eight as explained before.

Figure 32:
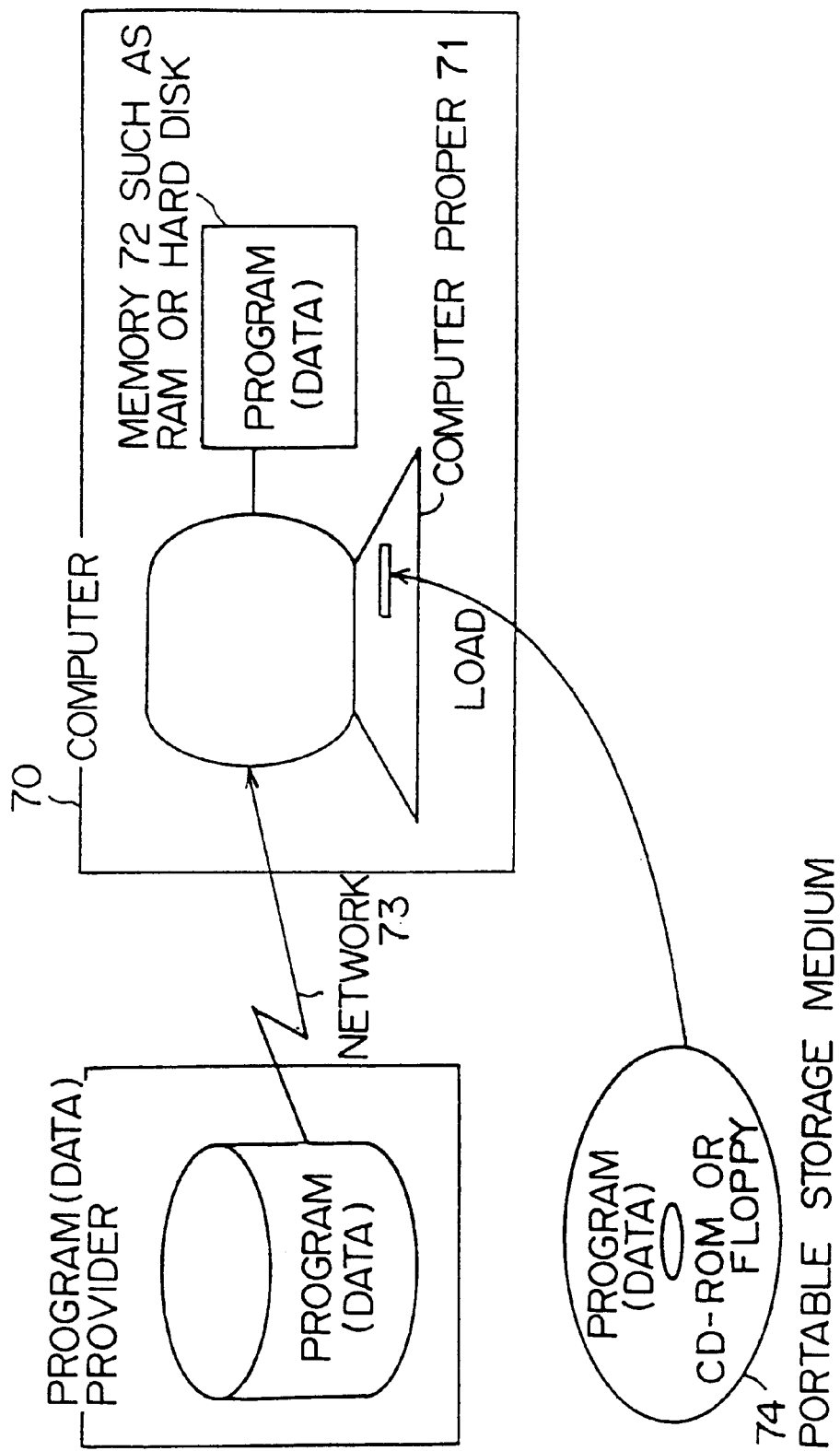
FIG. 32 is a diagram for explaining how to load programs for a polling process etc. into a computer.

FIG. 32 is a diagram for explaining how to load programs for a polling process etc. into a computer. Referring to the figure, the computer 70 is constructed of the computer proper 71 and a memory 72. The computer proper 71 can be loaded with the program, etc. from a portable storage medium 74, and can also be loaded with the program, etc. through a network 73 from the side of a program provider.

Programs mentioned in claims 19 through 22 of the present invention, the programs indicated in the flow charts of FIGS. 8 and 10, etc. are stored in, for example, the memory 72, and they are run by the computer proper 71. Here, a random access memory (RAM) or a hard disk, for example, is employed as the memory 72.

It is also possible that the program for the polling process, etc. be stored in the portable storage medium 74 and that the program be loaded into the computer 70, thereby to manage a network. The portable storage medium 74 may be any storage medium which is commercially available and which is circulatable, such as a memory card, floppy disk, CD-ROM, optical disk, or magneto optical disk. Further, it is possible that the program for the polling process, etc. be sent from the side of the program provider to the side of the computer 70 through the network 73 and that the program be loaded, thereby to incarnate network management.

What is claimed is:

1. A managing apparatus on a large-scale network to manage a plurality of apparatuses to-be-managed which constitute the large-scale network, comprising:

a number-of-times-of-status-changes information items acquisition unit for acquiring from the apparatus to-be-managed, number-of-times-of-status-changes information, which indicates the cumulative number of times of status changes of said apparatus to-be-managed;

a status change decision unit for comparing the acquired number-of-times-of-status-changes information, with the number-of-times-of-status changes information acquired last, so as to decide whether or not any status change has occurred since the last acquisition; and a status information acquisition unit for acquiring current status information of the apparatus to-be-managed from said apparatus to-be-managed as to which the occurrence of the status change has been decided by said status decision unit, wherein the number-of-times-of-status-changes information items of said apparatus to-be-managed are formed of a plurality of sorts of number-of-times-of-status-changes information items corresponding respectively to a plurality of groups into which the status information items of said apparatus to-be-managed are assorted.

2. A managing apparatus on a large-scale network as defined in claim 1, wherein said status information acquisition unit acquires the current status information of the group which corresponds to the number-of-times-of-status-changes information indicative of said occurrence of said status change, among the plurality of sorts of number-of-times-of-status-changes information items.

3. A managing apparatus on a large-scale network as defined in claim 1, wherein said number-of-times-of-status-changes information items acquisition unit acquires the number-of-times-of-status-changes information periodically.

4. A managing apparatus on a large-scale network as defined in claim 2, wherein said number-of-times-of-status-changes information items acquisition unit acquires the number-of-times-of-status-changes information periodically.

5. An apparatus to-be-managed on a large-scale network having a managing apparatus, and a plurality of such apparatuses to-be-managed which are managed by the managing apparatus, comprising:

a number-of-times-of-status-changes information storage unit for storing therein number-of-times-of-status-changes information which indicates the cumulative number of times of status changes; and a number-of-times-of-status-changes information update unit for updating the number-of-times-of-status-changes information stored in said number-of-times-of-status-changes information storage unit, when any status change has occurred, wherein the number-of-times-of-status-changes information are formed of a plurality of sorts of number-of-times-of-status-changes information items corresponding respectively to a plurality of groups into which the status information items of said apparatus to-be-managed are assorted, each of the plurality of sorts of information items being the cumulative number of times of changes in the status information of the particular group.

6. A managing apparatus on a large-scale network to manage a plurality of apparatuses to-be-managed which constitute the large-scale network, comprising:

a status-change information items acquisition unit for acquiring from the apparatus to-be-managed, status change information which indicates whether or not any status change in said apparatus to-be-managed has occurred; and a status information acquisition unit for acquiring current status information of the pertinent apparatus to-be-managed from the apparatus to-be-managed in which the status change has occurred, wherein the status change information items of said apparatus to-be-managed are formed of a plurality of sorts of status change information items corresponding respectively to a plurality of groups into which the status information items of said apparatus to-be-managed are assorted.

7. A managing apparatus on a large-scale network as defined in claim 6, wherein said status information acquisition unit acquires the current status information of the group which corresponds to the status change information indicative of the occurrence of the status change, among the plurality of sorts of status change information items.

8. A managing apparatus on a large-scale network as defined in claim 6, wherein said status-change information items acquisition unit acquires the status change information periodically.

9. A managing apparatus on a large-scale network as defined in claim 7, wherein said status-change information items acquisition unit acquires the status change information periodically.

10. An apparatus to-be-managed on a large scale network having a managing apparatus, and a plurality of such apparatuses to-be-managed which are managed by the managing apparatus, comprising:

status-change information storage means for storing therein status change information items which indicates that a status has changed; and status-change information write means for writing the status change information items into said status-change information storage means when the status change has occurred, wherein the status change information items of said apparatus to-be-managed are formed of a plurality of sorts of status change information items corresponding respectively to a plurality of groups into which the status information items of said apparatus to-be-managed are assorted.

11. A management method for managing a plurality of apparatuses to-be-managed which constitute a large-scale network, comprising:

forming number-of-times-of-status-changes information items of said apparatus to-be-managed into a plurality of sorts of number-of-times-of-status-changes information items corresponding respectively to a plurality of groups into which the status information items of said apparatus to-be-managed are assorted;

acquiring from the apparatus to-be-managed, number-of-times-of-status-changes information from said plurality of sorts which indicates the cumulative number of times of status changes in said apparatus to-be-managed;

comparing the acquired number of times of status changes, with the number of times of status changes as acquired last, so as to decide whether or not any status change has occurred since the last acquisition; and acquiring current status information of the apparatus to-be-managed from said apparatus to-be-managed as to which the occurrence of the status of change has been decided.

12. A management method for managing a plurality of apparatuses to-be-managed which constitute a large-scale network, comprising:

forming status change information items of said apparatus to-be-managed into a plurality of sorts of status change information items corresponding respectively to a plurality of groups into which the status information items of said apparatus to-be-managed are assorted;

acquiring from the apparatus to-be-managed, status change information items from said plurality of sorts which indicates whether or not any status change in said apparatus to-be-managed has occurred; and acquiring current status information of the apparatus to-be-managed from said apparatus to-be-managed in which the status change has occurred.

13. A storage medium in which a computer-readable management program for use in a managing apparatus on a large-scale network is stored, the managing apparatus operating to manage a plurality of apparatuses to-be-managed which constitute the network, comprising:

forming number-of-times-of-status-changes information items of said apparatus to-be-managed into a plurality of sorts of number-of-times-of-status-changes information items corresponding respectively to a plurality of groups into which the status information items of said apparatus to-be-managed are assorted;

causing said managing apparatus to acquire from the apparatus to-be-managed, number-of-times-of-statuschanges information from said plurality of sorts which indicates the cumulative number of times of status changes in said apparatus to-be-managed;

causing said managing apparatus to compare the acquired number of times of status changes, with the number of times of status changes as acquired last, so as to decide whether or not any status change has occurred since the last acquisition; and causing said managing apparatus to acquire current status information of the apparatus to-be-managed from said apparatus to-be-managed as to which the occurrence of the status change has been decided.

14. A storage medium in which a computer-readable management program for use in an apparatus to-be-managed on a large-scale network is kept stored, the network having a managing apparatus and a plurality of such apparatuses to-be-managed that are managed by the managing apparatus, comprising:

causing said apparatus to-be-managed to form number of times-of-status-changes information into a plurality of sorts of number-of-times-of-status-changes information corresponding respectively to a plurality of groups into which the status information of said apparatus to-be-managed are assorted, each of the plurality of sorts of information being the cumulative number of times of changes in the status information of the particular group;

causing the apparatus to-be-managed to store number-of-times-of-status-changes information from said plurality of sorts which indicates the cumulative number of times of status changes; and causing said apparatus to-be-managed to update the stored number-of-times-of-status-changes information when any status change has occurred.

15. A storage medium in which a computer-readable management program for use in a managing apparatus is kept stored, the managing apparatus operating to manage a plurality of apparatuses to-be-managed which constitute a large-scale network, comprising:

causing said managing apparatus to form the status change information of said apparatus to-be managed into a plurality of sorts of status change information corresponding respectively to a plurality of groups into which the status information items of said apparatus to-be-managed are assorted causing said managing apparatus to acquire from the apparatus to-be-managed, status change information which indicates whether or not any status change in said apparatus to-be-managed has occurred; and causing said managing apparatus to acquire from said plurality of sorts current status information of the apparatus to-be-managed from said apparatus to-be-managed in which the status change has occurred.

16. A storage medium in which a computer-readable management program for sue in an apparatus to-be-managed on a large-scale network is kept stored, the network having a managing apparatus and a plurality of such apparatuses to-be-managed that are managed by the managing apparatus, comprising the functions of:

forming status change information of said apparatus to-be-managed into a plurality of sorts of status change information corresponding respectively to a plurality of groups into which the status information of said apparatus to-be-managed are assorted;

judging whether or not any status change has occurred; and causing the apparatus to-be-managed to store status change information from said plurality of sorts, which indicates that any status has changed, when the status change has occurred.

* * * * *